US012738098B2

(12) United States Patent
Narusawa et al.

(10) Patent No.: US 12,738,098 B2
(45) Date of Patent: Sep. 15, 2026

(54) ACTION ANALYSIS DEVICE, ACTION ANALYSIS METHOD, ACTION ANALYSIS PROGRAM, PHOTOGRAPHING DEVICE, AND ACTION ANALYSIS SYSTEM

(71) Applicant: Sony Semiconductor Solutions Corporation, Atsugi (JP)

(72) Inventors: Ryu Narusawa, Atsugi (JP); Genta Matsukawa, Atsugi (JP); Kensaku Ogata, Atsugi (JP); Takeshi Kotani, Atsugi (JP)

(73) Assignee: Sony Semiconductor Solutions Corporation, Atsugi (JP)

( * ) Notice: Subject to any disclaimer, the term of this patent is extended or adjusted under 35 U.S.C. 154(b) by 270 days.

(21) Appl. No.: 18/681,110

(22) PCT Filed: Mar. 22, 2022

(86) PCT No.: PCT/JP2022/013286
§ 371 (c)(1),
(2) Date: Feb. 5, 2024

(87) PCT Pub. No.: WO2023/017647
PCT Pub. Date: Feb. 16, 2023

(65) Prior Publication Data

US 2025/0124739 A1 Apr. 17, 2025

(30) Foreign Application Priority Data

Aug. 12, 2021 (JP) ................................ 2021-131776

(51) Int. Cl.
*G06V 40/20* (2022.01)
*G06T 11/20* (2026.01)
*G06V 10/70* (2022.01)

(52) U.S. Cl.
CPC .............. *G06V 40/20* (2022.01); *G06V 10/70* (2022.01)

(58) Field of Classification Search
CPC ........ G06V 40/20; G06V 10/70; G06V 20/52; G06V 20/64; G06V 40/28; G05B 19/418;
(Continued)

(56) References Cited

U.S. PATENT DOCUMENTS 11,734,958 B2 * 8/2023 Valentino, III ........ G06V 40/20 348/159
2009/0112541 A1 4/2009 Anderson
(Continued)

FOREIGN PATENT DOCUMENTS

JP 2016-157357 A 9/2016
JP 2020-013341 A 1/2020
(Continued)

OTHER PUBLICATIONS

International Search Report and Written Opinion mailed on Jun. 14, 2022, received for PCT Application PCT/JP2022/013286, filed on Mar. 22, 2022, 11 pages including English Translation.

*Primary Examiner* — Oneal R Mistry
*Assistant Examiner* — Jongbong Nah
(74) *Attorney, Agent, or Firm* — XSENSUS LLP

(57) ABSTRACT

An action analysis device includes an acquisition unit that acquires behavior data indicating a behavior of an object during an operation process, which has been recognized by a model preliminarily learned for recognizing the object; and a determination unit that determines a required time for a process corresponding to the behavior data based on the behavior data acquired by the acquisition unit. For example, based on time information set as the required time for the process, the determination unit determines a required time for a process corresponding to the behavior data.

14 Claims, 17 Drawing Sheets

(58) Field of Classification Search
CPC .. G06T 7/20; G06T 7/00; G16Y 10/25; G16Y 20/20; G16Y 40/20; G16Y 40/30; G16Y 20/40; G06Q 50/04; Y02P 90/30
See application file for complete search history.

(56) References Cited

U.S. PATENT DOCUMENTS

| | | | | |
|---|---|---|---|---|
| 2017/0061326 | A1 | 3/2017 | Talathi et al. | |
| 2018/0247560 | A1* | 8/2018 | Mackenzie | A61B 90/361 |
| 2019/0006047 | A1 | 1/2019 | Gorek | |
| 2021/0006047 | A1* | 1/2021 | Masel | H01R 25/145 |
| 2022/0012514 | A1* | 1/2022 | Itoh | G06N 20/00 |

FOREIGN PATENT DOCUMENTS

| | | | | |
|---|---|---|---|---|
| JP | 2020-201772 | A | | 12/2020 |
| JP | 2021086218 | A | * | 6/2021 |
| WO | WO-2015033576 | A1 | | 3/2015 |
| WO | WO-2019138843 | A1 | | 7/2019 |
| WO | 2021/131552 | A1 | | 7/2021 |

* cited by examiner 1
100
200A
200B
200C
200D
300A
300B
300C
300D
400A
400B
400C
400D
10

30
31
32
33
34
35
36
37
38
×1
Camera
XXXX
Date
06/11/YYY
time
-:-:--
set
1min
download
Camera
XXXX
Date
06/11/YYY
time
-:-:--
set
1min
download

Figure 5:
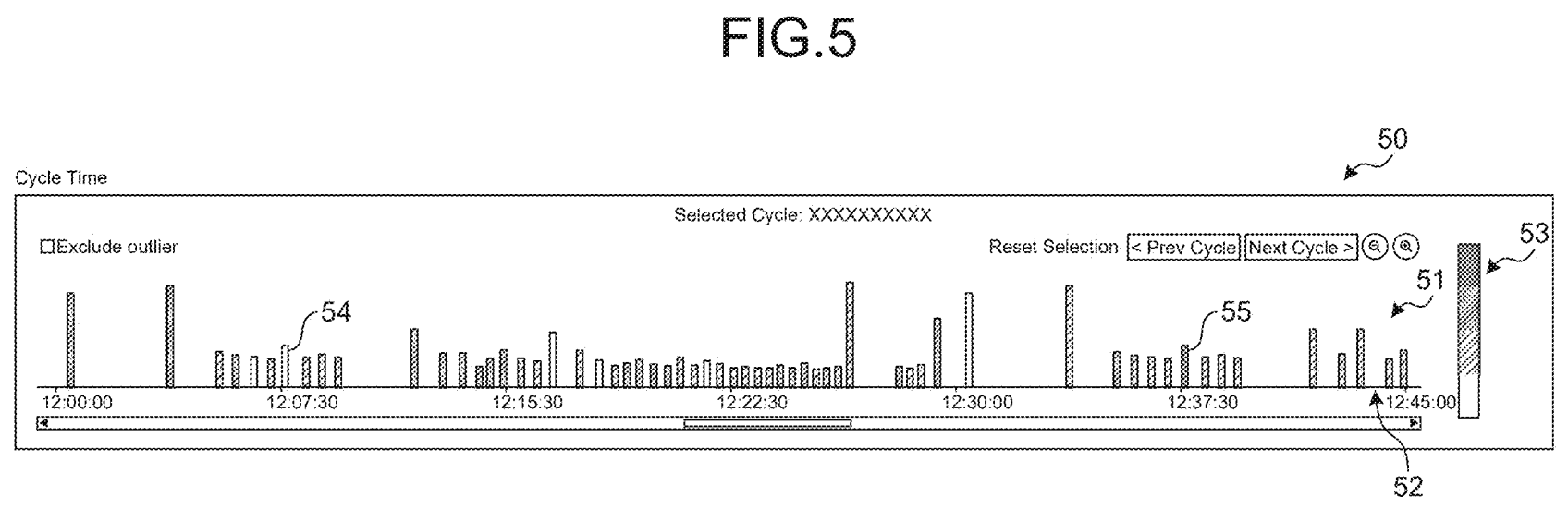

Cycle Time

☐Exclude outlier

Selected Cycle: XXXXXXXXXXX

Reset Selection

< Prev Cycle

Next Cycle >

12:00:00

12:07:30

12:15:30

12:22:30

12:30:00

12:37:30

12:45:00

51

52

53

54

55

60
50
40
31
32
XXXX XXXX XXXX XXXX
XXXX XXXX
Report
Camra
Date
Cycle Time
XXXXXXXXXXXXXX: XXXXXXXXXX
XXXXX
XXXXX
< XXXXX
XXXXX >
12:00:00
12:07:30
12:15:30
12:22:30
12:30:00
12:37:30
12:45:00
XXXXX
XXXXX
XXXXX
Hand Trace Graph
Right Hand X
Right Hand Y
Left Hand X
Left Hand Y
coordinate
integral time
Reference Cycle
Selected Cycle

June 11,YYYY,00:02:46

×1

84

82

Rearnalyze

YYYY-06-10

| Select | Start Time | Duration[sec] |
|---|---|---|
| ○ | June 10,YYYY,00:00:13 | 37.5 |
| ○ | June 10,YYYY,00:00:52 | 40.7 |
| ○ | June 10,YYYY,00:01:38 | 46.3 |
| ◉ | June 10,YYYY,00:02:37 | 33.3 |
| ○ | June 10,YYYY,00:03:21 | 40.1 |
| ○ | June 10,YYYY,00:04:07 | 40.4 |
| ○ | June 10,YYYY,00:04:58 | 35.6 |
| ○ | June 10,YYYY,00:05:41 | 39.8 |
| ○ | June 10,YYYY,00:06:36 | 27.9 |
| ○ | June 10,YYYY,00:07:09 | 39.8 |
| ○ | June 10,YYYY,00:07:56 | 53.2 |
| ○ | June 10,YYYY,00:08:57 | 38.3 |
| ○ | June 10,YYYY,00:09:48 | 32.5 |

<Prev Next> Cancel

91 (1) LEARNING DATA PHOTO-GRAPHING 92 (2) ANNOTATION 93 (3) LEARNING PROCESSING 94 (4) ANALYSIS TARGET DATA PHOTOGRAPHING 95 (5) INFERENCE PROCESSING

Figure 9:
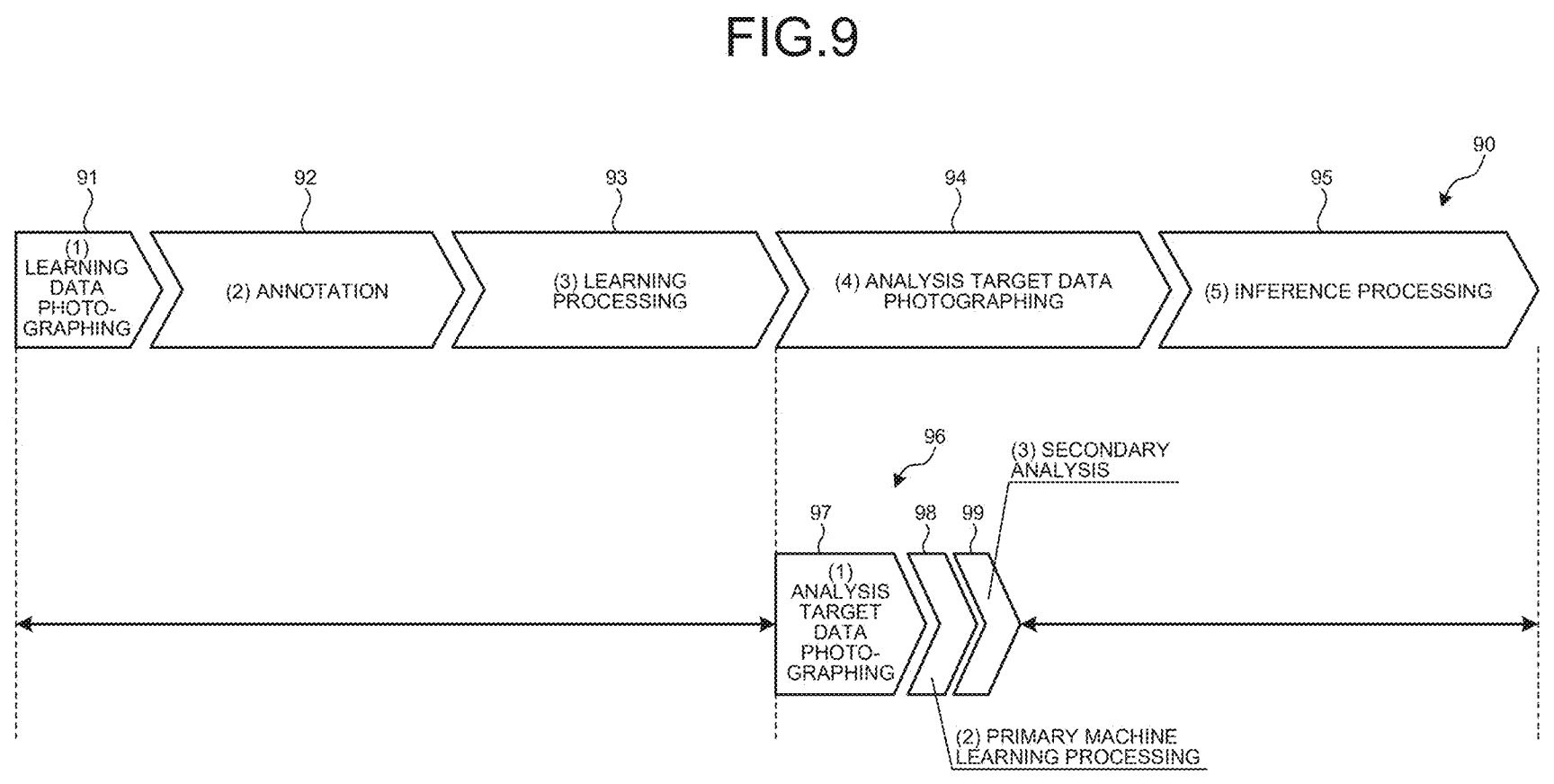

96

97 (1) ANALYSIS TARGET DATA PHOTO-GRAPHING 98 (2) PRIMARY MACHINE LEARNING PROCESSING 99 (3) SECONDARY ANALYSIS

| PHOTOGRAPH-ING DATA ID | PHOTOGRAPH-ING DATE AND TIME | IMAGE DATA | POINT CLOUD DATA | ... |
|---|---|---|---|---|
| ... | ... | ... | ... | ... |
| A01 | B01 | C01 | D01 | ... |
| A02 | B02 | C02 | D02 | ... |
| A03 | B03 | C03 | D03 | ... |
| A04 | B04 | C04 | D04 | ... |
| ... | ... | ... | ... | ... |

| RULE ID | SETTING DATE AND TIME | SETTING INFORMATION | ... |
|---|---|---|---|
| ... | ... | ... | ... |
| E01 | F01 | G01 | ... |
| E02 | F02 | B02 | ... |
| E03 | F03 | B03 | ... |
| E04 | F04 | B04 | ... |
| ... | ... | ... | ... |

300
DETECTION DEVICE
310
321
IMAGING UNIT
311
320
322
IMAGING PROCESS-ING UNIT
323
OUTPUT CONTROL UNIT
324
OUTPUT I/F
325
IMAGING CONTROL UNIT
331
CPU
332
DSP
333
MEMORY
334
COMMUNI-CATION I/F
335
IMAGE COMPRES-SION UNIT
336
INPUT I/F
330
313
312

ACTION ANALYSIS DEVICE, ACTION ANALYSIS METHOD, ACTION ANALYSIS PROGRAM, PHOTOGRAPHING DEVICE, AND ACTION ANALYSIS SYSTEM

CROSS-REFERENCE TO RELATED APPLICATIONS

The present application is based on PCT filing PCT/JP2022/013286, filed Mar. 22, 2022, which claims priority from Japanese Patent Application No. 2021-131776, filed Aug. 12, 2021, the entire contents of each are incorporated herein by reference.

FIELD

The present disclosure relates to an action analysis device, an action analysis method, an action analysis program, a photographing device, and an action analysis system for analyzing an action by using machine learning.

BACKGROUND

In order to improve efficiency of a process in a production site or homogenize operations in a plurality of factories, what procedure or time is desirable for executing an operation may be considered by imaging an operation performed in a site and analyzing the operation.

For example, there is known a method of analyzing a posture of an operator by acquiring skeleton data from features such as the skeleton and positions of joints of the operator and assigning a posture label to each skeleton data (e.g., Patent Literature 1). Alternatively, there is known a technique of measuring a degree of progress in each process by recognizing the positions of a wrist or shoulders of an operator with a skeleton recognition technique, a sensor, or the like and analyzing the operation (e.g., Patent Literature 2).

CITATION LIST

Patent Literature

Patent Literature 1: JP 2020-201772 A
Patent Literature 2: JP 2020-13341 A

SUMMARY

Technical Problem

There are, however, various postures of an operator in a site. Each of the postures needs annotation (setting of teacher data) to determine the postures with a machine learning model. This increases an operation burden. Moreover, in order to execute learning processing in a site, a problem of introduction cost arises. For example, it is necessary to provide a sufficient number of graphics processing units (GPUs) and to secure sufficient learning time.

Therefore, the present disclosure proposes an action analysis device, an action analysis method, an action analysis program, a photographing device, and an action analysis system capable of performing appropriate action analysis while reducing a load of learning.

Solution to Problem

In order to solve the above problems, an action analysis device according to an embodiment of the present disclosure includes: an acquisition unit that acquires behavior data indicating a behavior of an object during an operation process, which has been recognized by a model preliminarily learned for recognizing the object; and a determination unit that determines a required time for a process corresponding to the behavior data based on the behavior data acquired by the acquisition unit.

BRIEF DESCRIPTION OF DRAWINGS

FIG. 5 is a diagram (3) illustrating the action analysis processing according to the embodiment.

FIG. 8 is a diagram (4) illustrating a user interface according to the embodiment.

FIG. 9 is obtained by comparing conventional processing with the action analysis processing according to the embodiment.

FIG. 11 illustrates one example of a photographing data storage unit according to the embodiment.

FIG. 12 illustrates one example of a rule storage unit according to the embodiment.

DESCRIPTION OF EMBODIMENTS

An embodiment will be described in detail below with reference to the drawings. Note that, in the following embodiment, the same reference signs are attached to the same parts to omit duplicate description.

The present disclosure will be described in the following item order.

1. Embodiment
   - 1-1. Outline of Action Analysis Processing According to Embodiment
   - 1-2. Configuration of Action Analysis Device According to Embodiment
   - 1-3. Configuration of Detection Device According to Embodiment
   - 1-4. Configuration of Terminal Device According to Embodiment 1-5. Procedure of Processing According to Embodiment
1-6. Variations According to Embodiment
2. Other Embodiments
3. Effects of Action Analysis Device, Photographing Device, and Action Analysis System According to Present Disclosure
4. Hardware Configuration

1. Embodiment

1-1. Outline of Action Analysis Processing According to Embodiment

Figure 1:
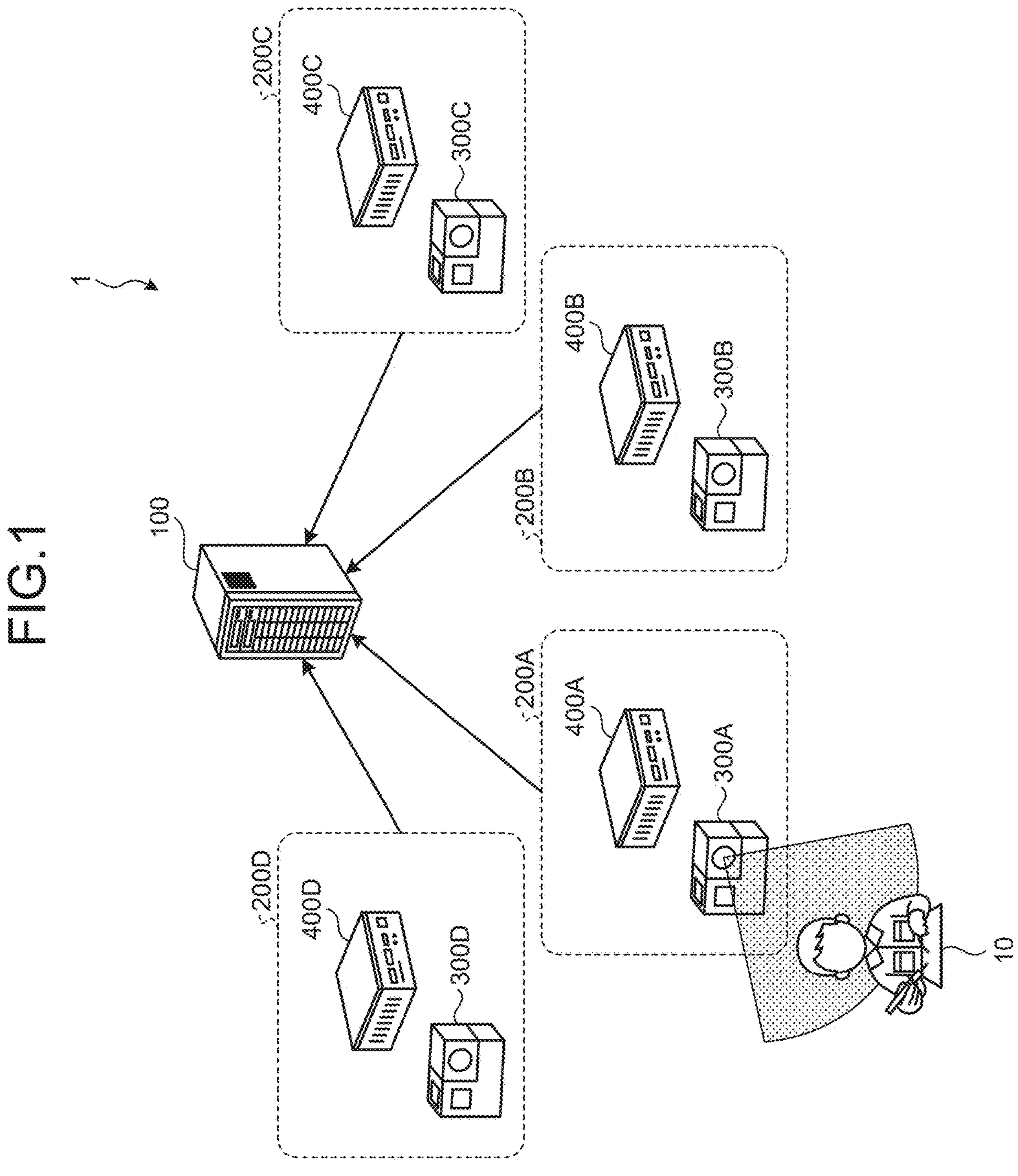
FIG. 1 outlines an action analysis system according to an embodiment.

One example of action analysis processing according to an embodiment of the present disclosure will be described with reference to FIG. 1. FIG. 1 outlines an action analysis system 1 according to the embodiment. Specifically, FIG. 1 illustrates components of the action analysis system 1 that executes the action analysis processing according to the embodiment.

As illustrated in FIG. 1, the action analysis system 1 includes an action analysis device 100, an edge 200A, an edge 200B, an edge 200C, and an edge 200D. The edge 200A, the edge 200B, the edge 200C, and the edge 200D have similar configurations, and include a detection device 300A, a detection device 300B, a detection device 300C, and a detection device 300D, and a terminal device 400A, a terminal device 400B, a terminal device 400C, and a terminal device 400D, respectively. Hereinafter, when it is unnecessary to distinguish the edge 200A, the detection device 300A, the terminal device 400A, and the like, the edge 200A, the detection device 300A, the terminal device 400A, and the like will be collectively referred to as an "edge 200", a "detection device 300", and a "terminal device 400".

The action analysis device 100 is one example of an information processing device that executes the action analysis processing according to the present disclosure. For example, the action analysis device 100 is a server and a personal computer (PC) installed in a factory. Specifically, the action analysis device 100 analyzes an action of an operator 10 in the factory in a process.

An edge 200 is a system that is installed in a factory and that photographs an action (e.g., operation process) of an operator, and is terminal equipment in the action analysis system 1. In the example in FIG. 1, the edge 200A is used to analyze an action of the operator 10. Furthermore, the edge 200B, the edge 200C, and the edge 200D are used to analyze actions of other operators (not illustrated). In the embodiment, the edge 200 includes a detection device 300 and a terminal device 400.

The detection device 300 is equipment having a function of photographing the operator 10, and is, for example, a digital camera. As described later, the detection device 300 internally includes an image sensor 310 (see FIG. 13), and has a function of recognizing a predetermined object by using a model preliminarily learned for object recognition.

For example, the detection device 300 includes a learned model for recognizing objects used in common in processes in various factories. For example, an object according to the embodiment includes a human hand, various tools such as a driver and a soldering iron, a mouse, a connector, and a bar code reader.

In a process of preliminary learning, object recognition is learned by using data preliminarily photographed in consideration of color difference of gloves, the size of a hand, and a difference in angles of view in a case where, for example, a human hand is learned. As described above, learning processing related to machine learning can be generalized by narrowing down a target to be recognized by the detection device 300. That is, in the action analysis system 1, a burden related to annotation of machine learning can be reduced by setting objects used in common in various factories as targets of preliminary learning. Moreover, the need for relearning suitable for each factory is eliminated by finishing learning that can be immediately introduced to various factories instead of learning specialized for data of one factory. Furthermore, inference processing is facilitated by narrowing down targets to be recognized and detected, which enables inference at low cost and high speed.

The terminal device 400 is equipment that communicates with or is connected to the detection device 300. The terminal device 400 acquires moving image data and behavior data. The detection device 300 has obtained the moving image data. The behavior data indicates a behavior of an object recognized by the detection device 300. Furthermore, the terminal device 400 communicates with or is connected to the action analysis device 100. The terminal device 400 transmits the moving image data and the behavior data acquired from the detection device 300 to the action analysis device 100.

Note that each device in FIG. 1 conceptually indicates a function of the action analysis system 1, and can have various modes depending on embodiments. For example, the action analysis device 100 may include two or more devices different for each function to be described later. Furthermore, a not-illustrated number of edges 200 may be included in the action analysis system 1.

As described above, in the example in FIG. 1, the action analysis system 1 is implemented by a combination of the action analysis device 100 and the edge 200. For example, the action analysis system 1 acquires the behavior data indicating a behavior of an object during an operation process, and determines a required time for the process corresponding to the behavior data based on the acquired behavior data. This enables the action analysis device 100 to determine a required time (cycle time) indicating how long it took for one process to be executed by the operator 10. The action analysis device 100 can calculate, for example, an average of times required by all operators, and analyze an operation situation such as whether or not the operator 10 has finished the process more quickly than other operators by measuring the required time for the process.

By the way, a method of proposing an efficient operation by analyzing a moving image obtained by photographing an operation process by using machine learning and the like has been explored in a site such as an assembly factory. For example, a method of analyzing what movements are efficient by making a video of how a skilled engineer performs an assembly operation and performing machine learning for movements of the engineer included in the video image has been considered. There are, however, various processes in a site. Each of the processes needs annotation (setting of teacher data) to determine the processes with a machine learning model. Moreover, in order to execute learning processing in a site, a problem of introduction cost arises. For example, it is necessary to provide a sufficient number of graphics processing units (GPUs) and to secure sufficient learning time.

In contrast, the action analysis system 1 according to the embodiment causes the edge 200 to recognize a predetermined object by using a preliminarily learned model, extracts behavior data, and analyzes an action. Specifically, the action analysis system 1 executes primary analysis and secondary analysis. In the primary analysis, facilitated inference processing through machine learning is performed. The inference processing corresponds to object recognition processing. In the secondary analysis, the behavior data is extracted, and an action is analyzed in accordance with a preset rule. This enables the action analysis system 1 to analyze an action of the operator 10 without requiring a time for annotation and without performing machine learning with a heavy load.

Figure 2:
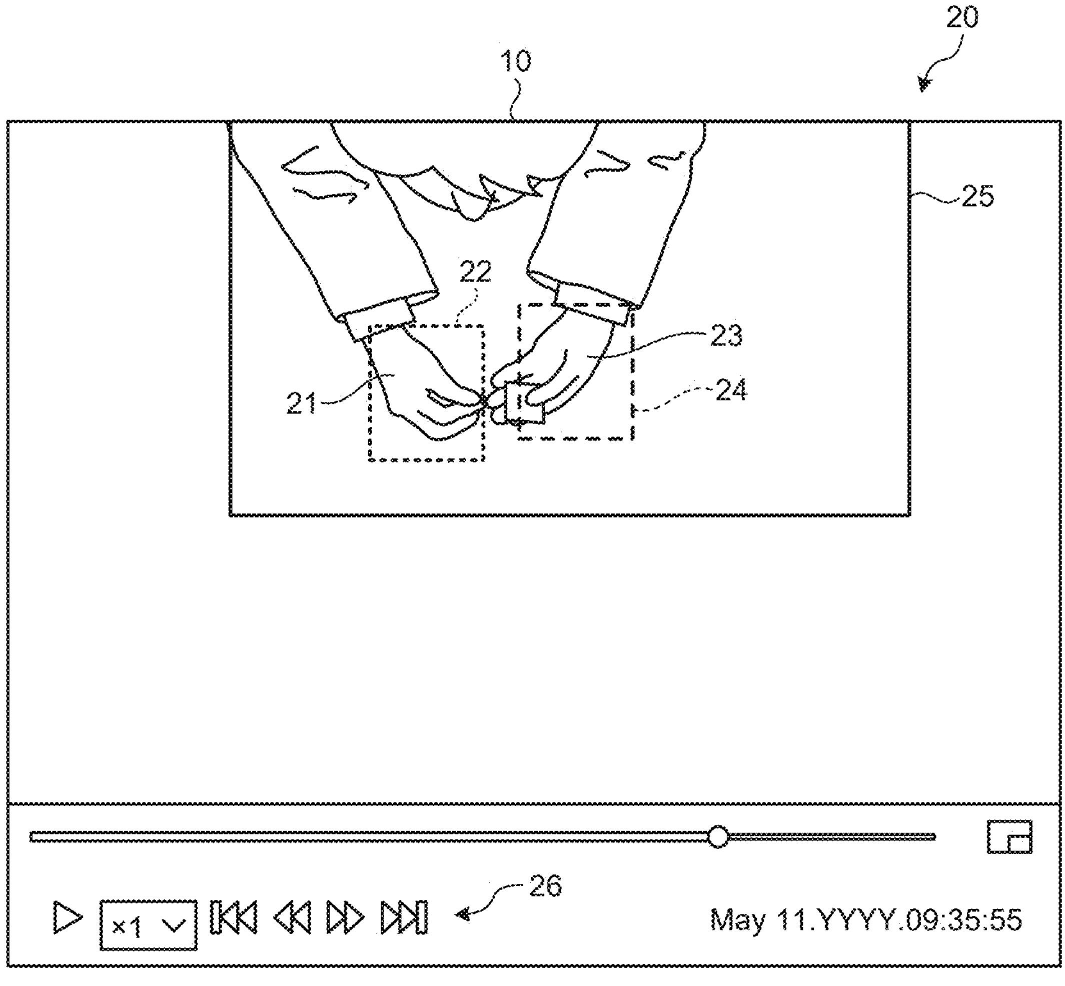
FIG. 2 is a diagram (1) illustrating action analysis processing according to the embodiment.

The action analysis processing according to the embodiment will be described below along a flow with reference to FIGS. 2 to 9. FIG. 2 is a diagram (1) illustrating the action analysis processing according to the embodiment.

FIG. 2 illustrates a moving image obtained by the edge 200 photographing how the operator 10 advances one process (e.g., process of assembling part of product).

The moving image captured by the edge 200 is transmitted from the edge 200 to the action analysis device 100. An administrator can view how the operator 10 advances the operation in real time or in a recorded moving image via the action analysis device 100.

Specifically, the action analysis device 100 provides a user interface 20 displayed on a display, and displays a moving image 25 in the user interface 20. As illustrated in FIG. 2, the moving image 25 includes tracking display 22 and tracking display 24, which indicate that the edge 200 recognizes an object. The tracking display 22 indicates that the edge 200 recognizes an object of a right hand 21 of the operator 10. The tracking display 24 indicates that the edge 200 recognizes an object of a left hand 23 of the operator 10. In the user interface 20, the administrator can view how the operator 10 performs the operation while operating an operation panel 26.

Furthermore, the edge 200 acquires behavior data indicating a behavior of each object while tracking the right hand 21 and the left hand 23. Coordinates indicating movements of a photographed object in a screen is one example of the behavior data. The behavior data is represented in a form of so-called point cloud data. That is, a behavior of which coordinates in the screen the right hand 21 has moved to and which coordinates in the screen the left hand 23 has moved to along a time axis can be recognized according to the behavior data acquired by the edge 200. Note that the point cloud data may be obtained by tracking any one point (e.g., center point) of the tracking display 22 or the tracking display 24, or may be obtained by tracking a plurality of points such as four corner points of the tracking display 22 or the tracking display 24.

Furthermore, the point cloud data is not limited to two-dimensional data, and may be three-dimensional data. For example, when the edge 200 includes a depth sensor such as a time of flight (ToF) sensor, the edge 200 may acquire three-dimensional data on an object.

Figure 3:
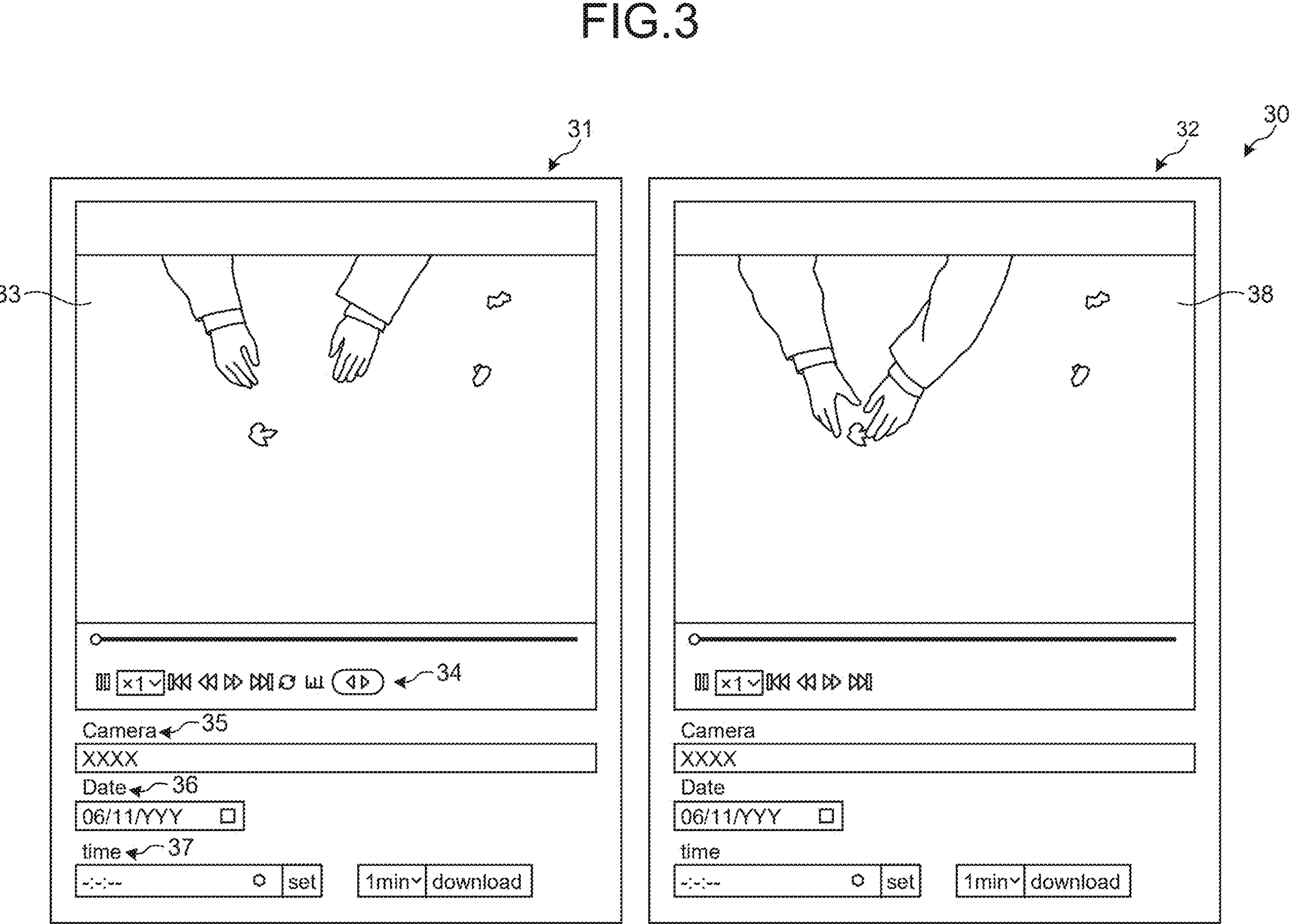
FIG. 3 is a diagram (1) illustrating a user interface according to the embodiment.

Next, a user interface at the time when moving images captured by the edge 200 are compared will be described with reference to FIG. 3. FIG. 3 is a diagram (1) illustrating the user interface according to the embodiment.

Two moving images are displayed side by side on a user interface 30 in FIG. 3. For example, a moving-image 33 obtained by photographing a skilled person skilled in one process is displayed in a moving-image field 31. Furthermore, a moving image 38 obtained by photographing the operator 10 to be compared with the skilled person is displayed in a moving-image field 32.

Each moving-image field includes an operation panel 34, a photographing information field 35, and a date and time information field 27. The photographing information field 35 indicates which edge 200 was used for photographing. The date and time information field 27 indicates when the photographing was performed. The administrator can check an action of the operator 10 compared to that of the skilled person while visually recognizing these pieces of information.

Figure 4:
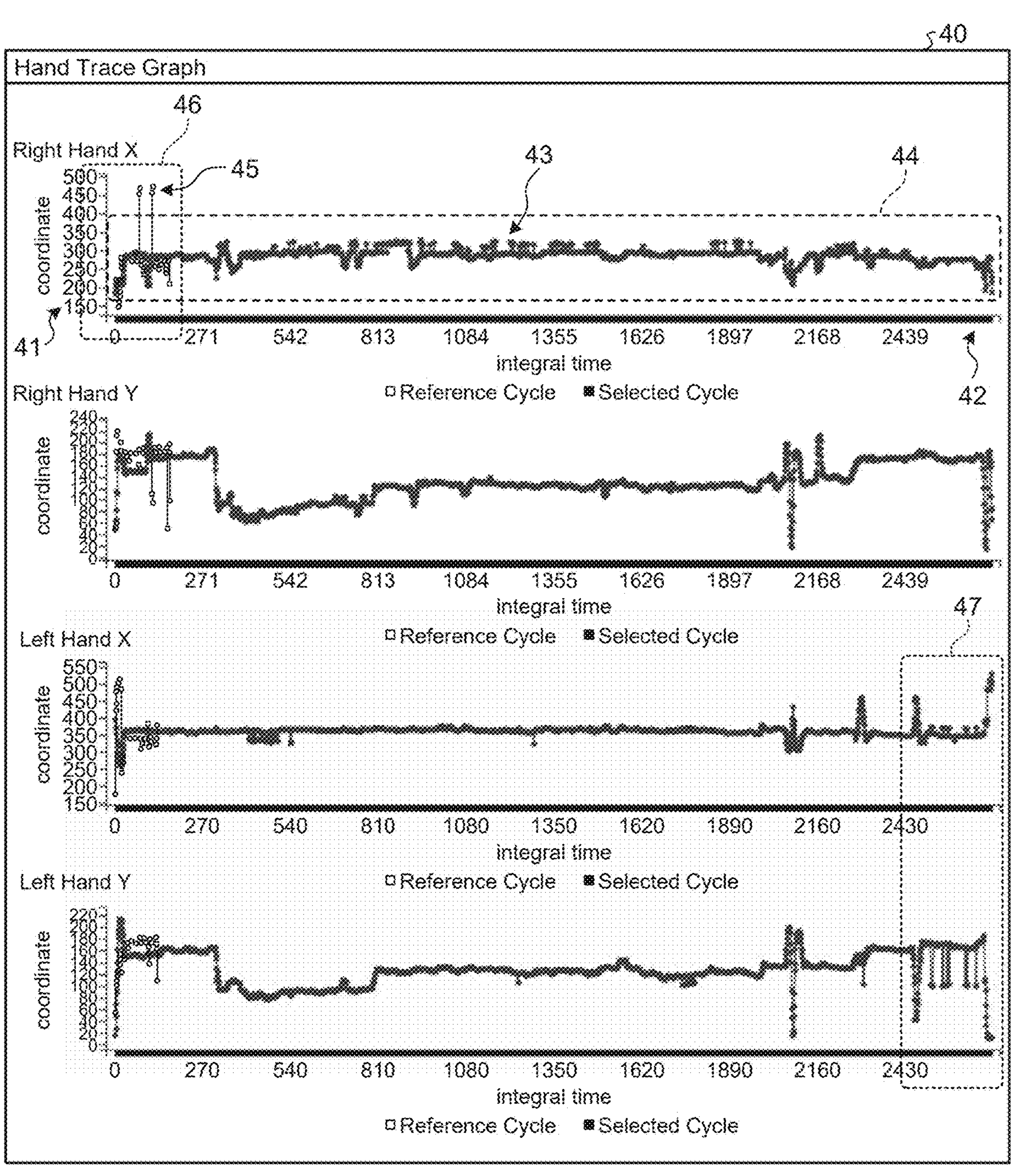
FIG. 4 is a diagram (2) illustrating the action analysis processing according to the embodiment.

Subsequently, an example in which the action analysis device 100 analyzes behavior data indicating a behavior of an object recognized by the edge 200 will be described with reference to FIG. 4. FIG. 4 is a diagram (2) illustrating the action analysis processing according to the embodiment.

FIG. 4 illustrates graph display 40 that displays behavior data obtained by recording movements of a hand of the operator 10. The graph display 40 is obtained by recording movements of hands of the operator 10 until completion of one process, that is, movements in an X axis and a Y axis of each of a right hand and a left hand.

In the example in FIG. 4, a vertical axis 41 indicates the magnitude of a value in a case where a behavior is indicated as coordinates. A horizontal axis 42 indicates time. A first behavior data waveform 43 is obtained by recording movements of a hand of the operator 10 along time. A first cycle time 44 indicates a set of a series of waveforms indicating from the start to the end of one process. Note that details of the determination of the cycle time will be described later.

In the example in FIG. 4, a second behavior data waveform 45 is displayed so as to be superimposed on the first behavior data waveform 43 indicating a behavior of the operator 10. The second behavior data waveform 45 indicates behavior data on another operator to be compared with the operator 10, and corresponds to, for example, behavior data of a skilled person. A second cycle time 46 indicates a cycle time in a case where a skilled person executes the same process as the process executed by the operator 10. As illustrated in FIG. 4, the second cycle time 46 of the skilled person is shorter than the first cycle time 44 of the operator 10.

At the end of a cycle time, for example, movements of a hand exceeding a predetermined value is observed as indicated by a waveform 47. In the example in FIG. 4, the waveform 47 indicates that both hands of the operator 10 move to positions deviating from a region where coordinates can be observed (e.g., photographing angle of view of camera).

Although the edge 200 acquires the behavior data in FIG. 4, the action analysis device 100 analyzes the behavior data. The action analysis device 100 executes predetermined analysis in accordance with setting made by an administrator or the like.

For example, in the example in FIG. 4, the action analysis device 100 analyzes an action by comparing similarity between the first behavior data waveform 43 and the second behavior data waveform 45. The first behavior data waveform 43 indicates an operation situation of the operator 10. The second behavior data waveform 45 indicates an operation situation of the skilled person. For example, the action analysis device 100 applies similarity analysis and the like, which are referred to as dynamic time warping (DTW) and the like. According to such a method, the action analysis device 100 can obtain quantitative information such as how the operation of the operator 10 is different from that of the skilled person without depending on the time axis. For example, the action analysis device 100 can determine that there is no problem in the operation itself of the operator 10 although the operator 10 needs more time than the skilled person. Alternatively, the action analysis device 100 can detect that there is a difference between the first behavior data waveform 43 and the second behavior data waveform 45, and thus the operator 10 may have forgotten one of operations in the process or may erroneously perform assembly processing.

Next, an example in which a result of analysis of the action analysis device 100 is displayed will be described with reference to FIG. 5. FIG. 5 is a diagram (3) illustrating the action analysis processing according to the embodiment.

FIG. 5 illustrates graph display 50 that displays results of a plurality of cycle times in a case where the operator 10 repeats one process for a certain time. Results 51 in the graph display 50 indicate required times taken in processes in the case where the operator 10 repeats one process. A horizontal axis 52 in the graph display 50 indicates a time when an action of the operator 10 was observed.

In the graph display 50, the results 51 are displayed in different colors based on different color display 53. In one example, the action analysis device 100 displays the results 51 in different colors based on the similarity between behavior data on the skilled person to be compared and behavior data on the operator 10.

For example, a result 54 indicates a process in which the behavior data on the skilled person to be compared is similar to the behavior data on the operator 10 and there is no problem. In contrast, a result 55 indicates a process in which the behavior data on the skilled person to be compared is not similar to the behavior data on the operator 10 and there is a problem. For example, the result 55 is highlighted in red so as to be more conspicuous than the result 54. This enables the administrator to verify whether or not the action of the operator 10 has a problem within a certain time. When recognizing a process with a problem as indicated by the result 55, the action analysis device 100 may perform processing of transmitting an alert to a mobile terminal used by the administrator.

Note that the action analysis device 100 may highlight a result in accordance with a time of a cycle time. For example, the action analysis device 100 may highlight a process having an extremely longer cycle time than another process. Also in such a case, the action analysis device 100 may transmit an alert to the mobile terminal used by the administrator.

Figure 6:
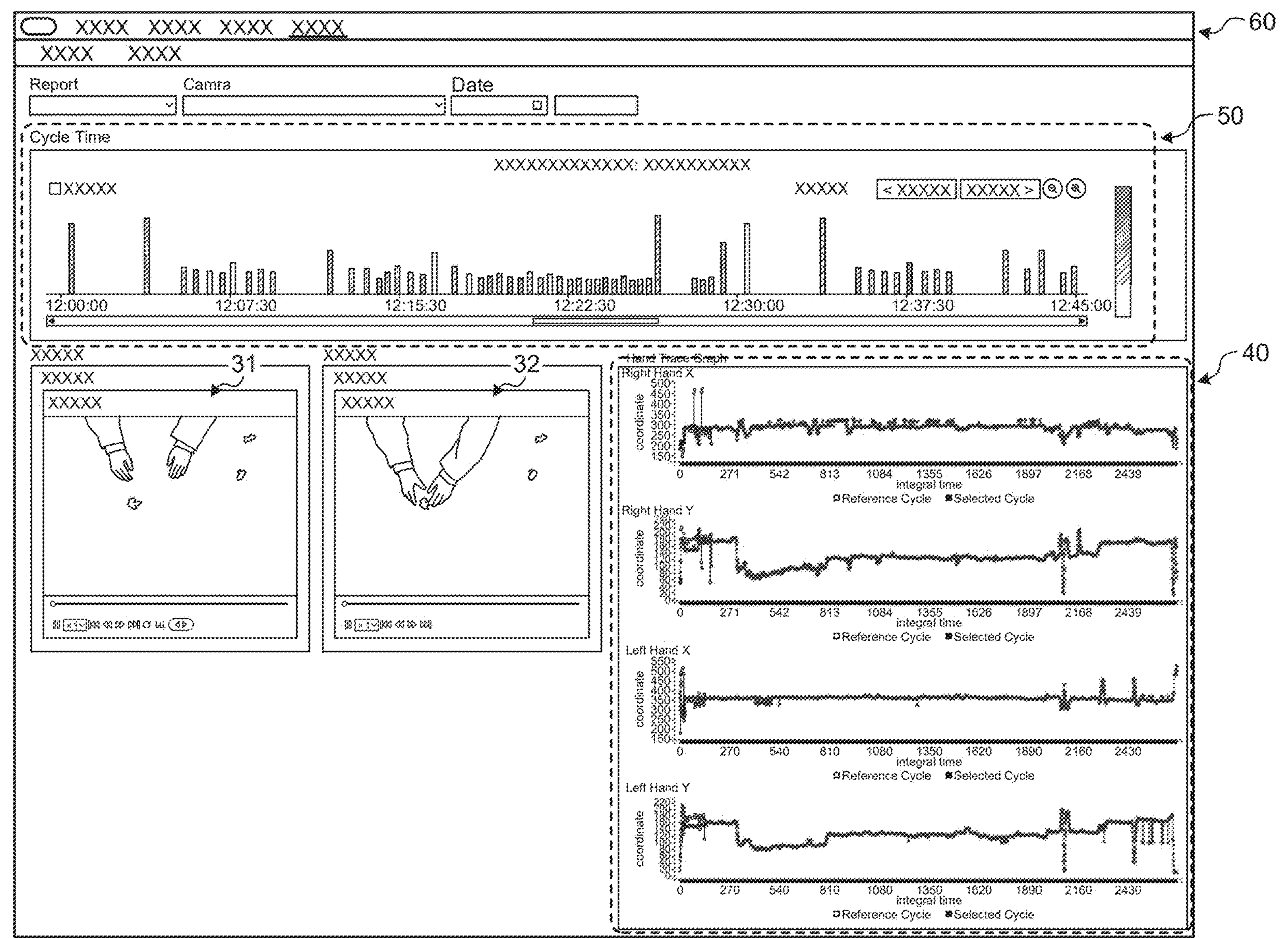
FIG. 6 is a diagram (2) illustrating a user interface according to the embodiment.

Next, a user interface that lists analyses of the action analysis device 100 will be described with reference to FIG. 6. FIG. 6 is a diagram (2) illustrating a user interface according to the embodiment.

The moving-image field 31, the moving-image field 32, the graph display 40, and the graph display 50 in FIG. 3 are listed in a user interface 60 in FIG. 6. The administrator checks the graph display 50. When finding a result with a problem, the administrator selects the result. When a result is selected, the action analysis device 100 displays a moving image corresponding to the result in the moving-image field 31 or the moving-image field 32. Furthermore, the action analysis device 100 displays behavior data corresponding to the result in the graph display 40.

Here, processing in which the action analysis device 100 determines a cycle time will be described with reference to FIG. 7. In the embodiment, the action analysis device 100 receives rules (various pieces of setting information) for analysis from the administrator or the like, and determines the cycle time or the like in accordance with the rules.

Figure 7:
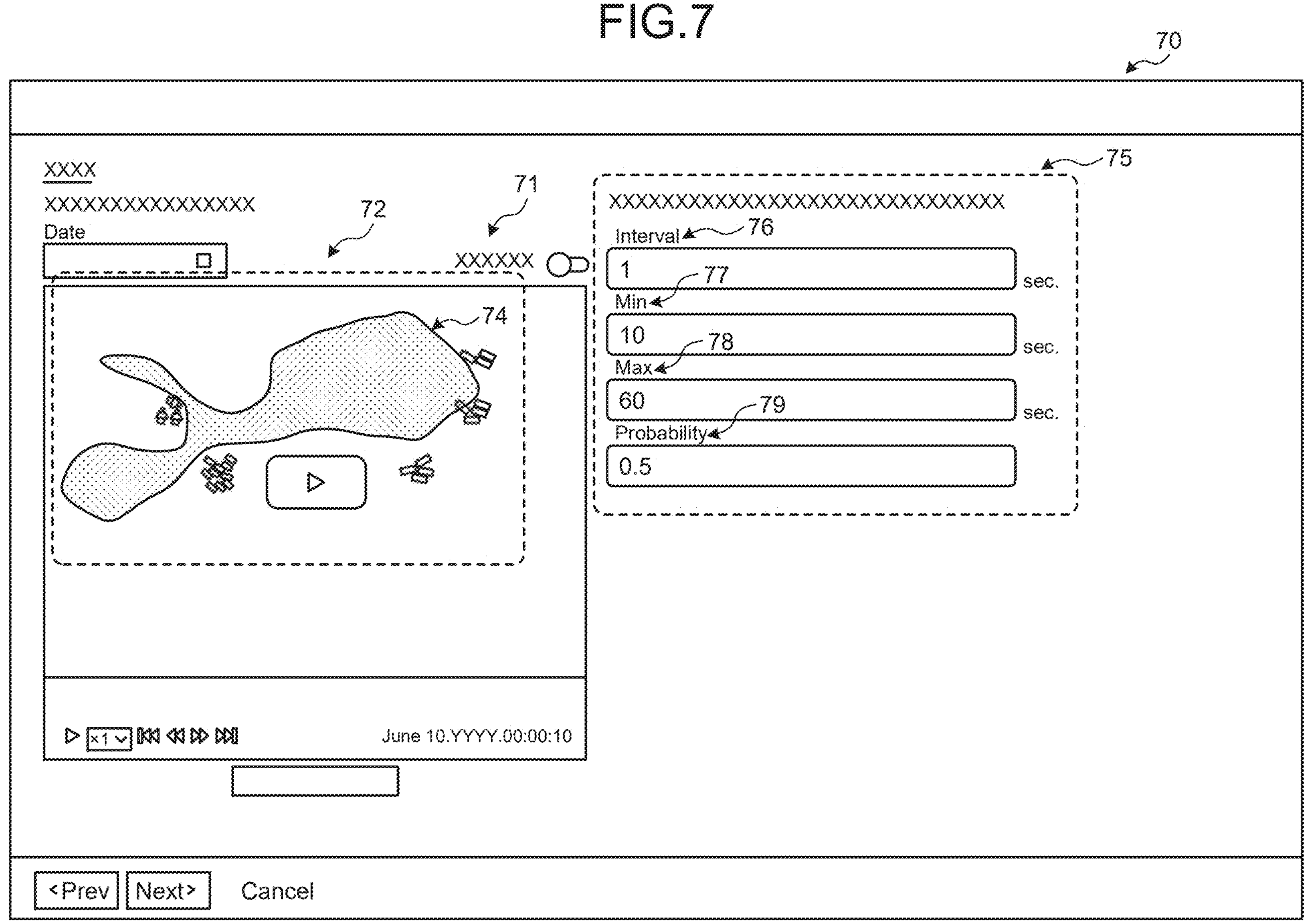
FIG. 7 is a diagram (3) illustrating a user interface according to the embodiment.

FIG. 7 is a diagram (3) illustrating a user interface according to the embodiment. A user interface 70 in FIG. 7 includes a video 71 captured by the edge 200. The video 71 includes a region setting 72. The region setting 72 is a region optionally set by the administrator or the like, and indicates a region in the video 71 where the operator 10 is estimated to perform an operation. For example, when an object is observed in the region setting 72, the action analysis device 100 determines that the operator 10 is performing an operation. In contrast, when an object being recognized is present in a range exceeding the region setting 72 for a predetermined time or more (e.g., several seconds or more), the action analysis device 100 determines that one process has ended.

When the administrator determines the region setting 72, the action analysis device 100 may display a reference region 74 based on a past moving-image history. The reference region 74 is a range where the object is frequently present. The reference region 74 indicates that the object is often present at a position in a certain process, and is superimposed and displayed on the video 71, for example. The administrator determines the region setting 72 with reference to the reference region 74. Note that, although the region setting 72 is illustrated as a rectangle in the example in FIG. 7, the region setting 72 may be set in any shape instead of a rectangle. Furthermore, when the edge 200 includes a ToF sensor, the action analysis device 100 may set the region setting 72 with three-dimensional information.

Furthermore, the administrator inputs information to a setting item 75, and determines a rule for determining a cycle time. The setting item 75 includes an interval setting 76, a minimum time setting 77, a maximum time setting 78, and a flexibility setting 79.

The interval setting 76 is an item for setting a time taken to determine that an object being recognized is present in a range exceeding the region setting 72 and one process has ended. The minimum time setting 77 is an item determined as a minimum time at the time when a cycle time of one process is determined. For example, when a cycle time is determined, the action analysis device 100 avoids determining a time shorter than a time input in the minimum time setting 77 as the cycle time. The maximum time setting 78 is an item to be determined as a maximum time at the time when a cycle time of one process is determined. For example, when a cycle time is determined, the action analysis device 100 avoids determining a time longer than a time input in the maximum time setting 78 as the cycle time. The flexibility setting 79 is a numerical value indicating how strictly the above-described settings are applied. As described above, the administrator can efficiently perform the secondary analysis of behavior data acquired by the edge 200 by inputting an approximate cycle time estimated in one process as a rule.

Processing in which the action analysis device 100 determines a cycle time after a rule is set will be described with reference to FIG. 8. FIG. 8 is a diagram (4) illustrating a user interface according to the embodiment.

A user interface 80 in FIG. 8 includes a list 81 of moving images recorded at the time when one process is repeated. When detecting that the administrator presses a reanalysis button 84 after a rule is set, the action analysis device 100 analyzes the moving image in the list 81 based on the rule.

For example, the action analysis device 100 determines a cycle time of a process with reference to behavior data corresponding to each moving image based on the information set as the rule. Specifically, the action analysis device 100 determines a time for which an object deviates from a set region in the behavior data. When the time exceeds a set value, the action analysis device 100 determines that the process has ended. Furthermore, the action analysis device 100 determines the cycle time as the maximum set value for behavior data in which a behavior of the object can be observed but the time exceeds a set value of the maximum time setting. In this case, the action analysis device 100 may transmit an alert to the administrator or the like assuming that there is some problem in the process.

When the reanalysis ends, the action analysis device 100 determines a cycle time 82 of each process listed in the list 81. As described above, the action analysis device 100 can determine a cycle time of each process without requiring processing such as complicated machine learning by performing secondary analysis on behavior data based on a set rule.

Thereafter, when desiring to check a moving image, the administrator can display a moving image 88 in a moving-image field 85 by pressing a selection button 83 displayed on the user interface 80. For example, the administrator may select a moving image having the shortest cycle time, and use the moving image as a sample to be viewed by other operators. Alternatively, the administrator may select a moving image having the longest cycle time, and view what kind of problem the process has.

When a moving image is reproduced, tracking display 86 and tracking display 87 are superimposed and displayed on the moving image. This enables the administrator to appropriately check how the operator 10 performs an operation.

The action analysis processing according to the embodiment has been described above with reference to FIGS. 1 to 8. Here, a comparison between the action analysis processing according to the embodiment and action analysis processing through conventional machine learning will be described with reference to FIG. 9. FIG. 9 is obtained by comparing conventional processing with the action analysis processing according to the embodiment.

FIG. 9 illustrates a flow 90 according to a conventional technique and a flow 96 according to the embodiment. The flow 90 according to the conventional technique needs five processes of learning data photographing, annotation, learning processing, analysis target data photographing, and inference processing. The learning data photographing serves as a first procedure 91. The annotation serves as a second procedure 92. The learning processing serves as a third procedure 93. The analysis target data photographing serves as a fourth procedure 94. The inference processing serves as a fifth procedure 95. Furthermore, in the flow 90 according to the conventional technique, a lot of time is spent for processing in a previous stage. The processing includes photographing of a process, labeling (annotation) of what kind of operation the captured video illustrates, and learning processing for recognizing the operation.

In contrast, in the flow 96 according to the embodiment, only analysis target data photographing, primary machine learning processing, and secondary analysis are required to be performed. The analysis target data photographing serves as a first procedure 97. The primary machine learning processing serves as a second procedure 98. The secondary analysis serves as a third procedure 99. This is achieved, in the flow 96 according to the embodiment, by introducing the edge 200 having a learned model of a preliminarily recognized object to a factory prior to the first procedure 97. Furthermore, in the second procedure 98, only relatively facilitated inference processing of object recognition is executed, so that recognition processing can be executed almost at the same time as photographing. Then, in the third procedure 99, analysis can be ended without requiring a lot of time unlike in the fifth procedure 95 in the flow 90 according to the conventional technique by analyzing behavior data based on a rule. Furthermore, in the flow 96 according to the embodiment, an alert can be immediately transmitted when an abnormality is detected by quickly performing the third procedure 99, which contributes to improvement of efficiency in the entire factory.

1-2. Configuration of Action Analysis Device According to Embodiment

Figure 10:
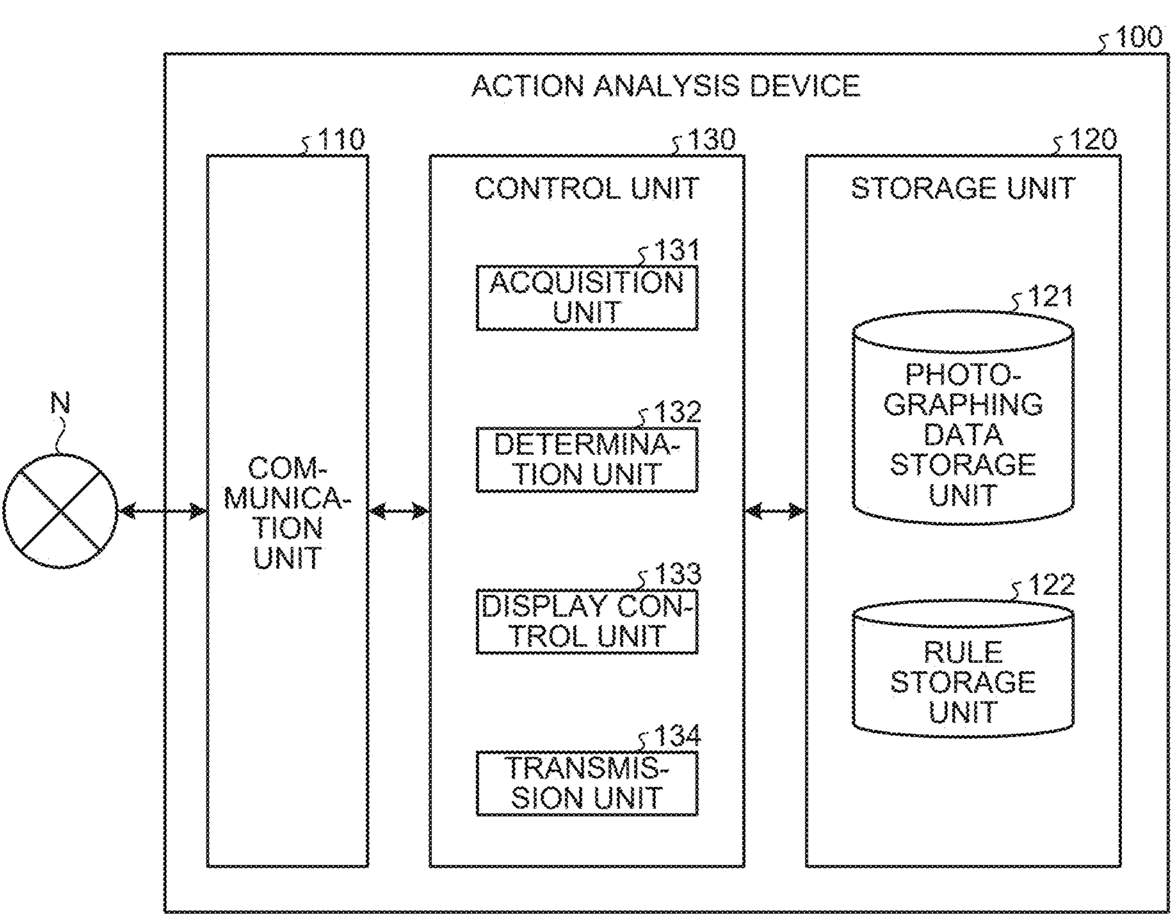
FIG. 10 illustrates a configuration example of the action analysis device according to the embodiment.

Next, the configuration of the action analysis device 100 will be described. FIG. 10 illustrates a configuration example of the action analysis device 100 according to the embodiment.

As illustrated in FIG. 10, the action analysis device 100 includes a communication unit 110, a storage unit 120, and a control unit 130. Note that the action analysis device 100 may include an input unit (e.g., keyboard and touch display) and a display unit (e.g., liquid crystal display). The input unit receives various operations from an administrator and the like who manage the action analysis device 100. The display unit displays various pieces of information.

The communication unit 110 is implemented by, for example, a network interface card (NIC) and a network interface controller. The communication unit 110 is connected to a network N in a wired or wireless manner, and transmits and receives information to and from the edge 200 and the like via the network N. The network N is implemented by a wireless communication standard or system such as Bluetooth (registered trademark), the Internet, Wi-Fi (registered trademark), ultra wide band (UWB), and low power wide area (LPWA).

The storage unit 120 is implemented by, for example, a semiconductor memory element, such as a random access memory (RAM) and a flash memory, or a storage device, such as a hard disk and an optical disk. The storage unit 120 includes a photographing data storage unit 121 and a rule storage unit 122. Each storage unit will be sequentially described below with reference to FIGS. 11 and 12.

FIG. 11 illustrates one example of the photographing data storage unit 121 according to the embodiment. As illustrated in FIG. 11, the photographing data storage unit 121 includes items of "photographing data ID", "photographing date and time", "image data", and "point cloud data". Note that, although FIGS. 11 and 12 may conceptually illustrate information stored in the storage unit 120 as "A01", actually, the storage unit 120 stores each piece of information to be described later.

The "photographing data ID" is identification information for identifying photographing data. The "photographing date and time" indicates the date and time when the edge 200 performs photographing. The "image data" indicates image (moving image) data captured by the edge 200. The "point cloud data" indicates data indicating the behavior of an object recognized by the edge 200.

Next, the rule storage unit 122 will be described. FIG. 12 illustrates one example of the rule storage unit according to the embodiment.

In the example in FIG. 12, the rule storage unit 122 includes items of "rule ID", "setting date and time", and "setting information". The "rule ID" indicates identification information for identifying a rule. The "setting date and time" indicates the date and time when the rule is set. The "setting information" indicates setting information set as a rule. For example, the setting information corresponds to each piece of information included in the setting item 75 in FIG. 7 and the like.

Returning to FIG. 10, the description will be continued. The control unit 130 is implemented by, for example, a central processing unit (CPU), a micro processing unit (MPU), and a GPU executing a program (e.g., action analysis program according to present disclosure) stored in the action analysis device 100 by using a random access memory (RAM) or the like as an operation region. Furthermore, the control unit 130 is a controller, and may be implemented by an integrated circuit such as an application specific integrated circuit (ASIC) and a field programmable gate array (FPGA).

As illustrated in FIG. 10, the control unit 130 includes an acquisition unit 131, a determination unit 132, a display control unit 133, and a transmission unit 134.

The acquisition unit 131 acquires various pieces of information. For example, the acquisition unit 131 acquires behavior data indicating a behavior of an object during an operation process, which has been recognized by a model preliminarily learned for recognizing the object.

Specifically, the acquisition unit 131 acquires behavior data from the edge 200. More specifically, the acquisition unit 131 acquires behavior data on an object detected by an image sensor from the image sensor by using a model incorporated in a logic chip 312 integrated with the image sensor of the detection device 300.

The acquisition unit 131 may acquire only behavior data (point cloud data), or may acquire image data together with the behavior data. The acquisition unit 131 stores the acquired data in the photographing data storage unit 121.

The determination unit 132 determines a required time (cycle time) for a process corresponding to the behavior data based on the behavior data acquired by the acquisition unit 131.

For example, based on time information set as the required time for the process, the determination unit 132 determines a required time for a process corresponding to the behavior data.

Specifically, the determination unit 132 determines a process break corresponding to behavior data at the timing when the behavior data in which an object exhibits a predetermined behavior is observed between the minimum time and the maximum time set as the time information. For example, when a behavior of the object exceeding a predetermined value is observed in the point cloud data as in the waveform 47 in FIG. 4, the determination unit 132 determines the process break corresponding to the behavior data. In other words, when a behavior of the object exceeding a predetermined value is observed in the point cloud data, the determination unit 132 determines a process break, and determines a required time for the process.

Furthermore, the determination unit 132 may determine whether or not the object has exhibited a predetermined behavior based on region information set as an operation region of the process, and determine a process break corresponding to the behavior data. For example, the determination unit 132 may determine the process break corresponding to the behavior data at the timing when behavior data indicating that a predetermined time has elapsed since the object deviated from a region set as region information is observed. That is, the determination unit 132 refers to the region setting 72 as illustrated in FIG. 7, determines the process break at the timing indicating that a predetermined time has elapsed since the object deviated from the region, and determines a required time for the process.

The display control unit 133 displays various user interfaces including various pieces of information on a display or the like. Furthermore, the display control unit 133 receives various pieces of information from the administrator via the user interfaces.

For example, the display control unit 133 lists required times for processes corresponding to behavior data determined by the determination unit 132 a plurality of times on a user interface along a time axis. That is, as illustrated in FIGS. 5 and 6, the display control unit 133 displays required times for a plurality of processes executed by the operator 10 over a certain time in a graph. This enables the administrator to check, at a glance, that in how long a required time the operator 10 completes one process.

Furthermore, the display control unit 133 compares first behavior data with second behavior data. The first behavior data is optionally selected from a plurality of pieces of behavior data. The second behavior data is used as a comparison target. A portion of a required time corresponding to one process is highlighted based on the similarity between behavior data corresponding to one process in the second behavior data and behavior data corresponding to one process in the first behavior data. For example, as illustrated in FIG. 5, when an operation situation of the skilled person is not similar to an operation situation of the operator 10 to be compared in a certain process, the display control unit 133 displays the portion corresponding to the process in a highlighting color. This enables the administrator to grasp, at a glance, in which process the operator 10 does not appropriately perform the operation.

Furthermore, the display control unit 133 may display a result obtained by comparing the first behavior data with the second behavior data on the user interface in a graph. The first behavior data is optionally selected from a plurality of pieces of behavior data. The second behavior data is used as a comparison target. For example, as illustrated in FIG. 4, in a certain process, the display control unit 133 displays a waveform of the behavior data on the skilled person and a waveform of the behavior data on the operator 10 to be compared in a superimposed manner.

Furthermore, the display control unit 133 may determine whether or not there is an abnormality in the process corresponding to the second behavior data based on the similarity between the waveform corresponding to the first behavior data and the waveform corresponding to the second behavior data in the graph. For example, the display control unit 133 determines the similarity between the skilled person and a waveform corresponding to behavior data on the operator 10 to be compared based on a method such as DTW.

More specifically, the display control unit 133 determines whether or not a plurality of processes corresponding to the second behavior data matches a plurality of processes corresponding to the first behavior data based on the similarity between the waveform corresponding to the first behavior data and the waveform corresponding to the second behavior data in the graph. When the plurality of processes does not match each other, the display control unit 133 determines that there is an abnormality in a process corresponding to the second behavior data. In this case, the plurality of processes may indicate a plurality of small processes performed within a certain cycle time. That is, the display control unit 133 compares a waveform of the skilled person or a sample waveform with the waveform of the operator 10 to be compared. When a portion that is not similar is detected, the display control unit 133 determines that some small process has been skipped, and detects an abnormality.

When the display control unit 133 determines that there is an abnormality in the process corresponding to the second behavior data, the transmission unit 134 transmits a warning to a preliminarily registered transmission destination. For example, the transmission unit 134 transmits an alert to a mobile terminal held by the administrator. Alternatively, the transmission unit 134 may perform control to display the alert on the user interface displayed by the display control unit 133.

1-3. Configuration of Detection Device According to Embodiment

Figure 14:
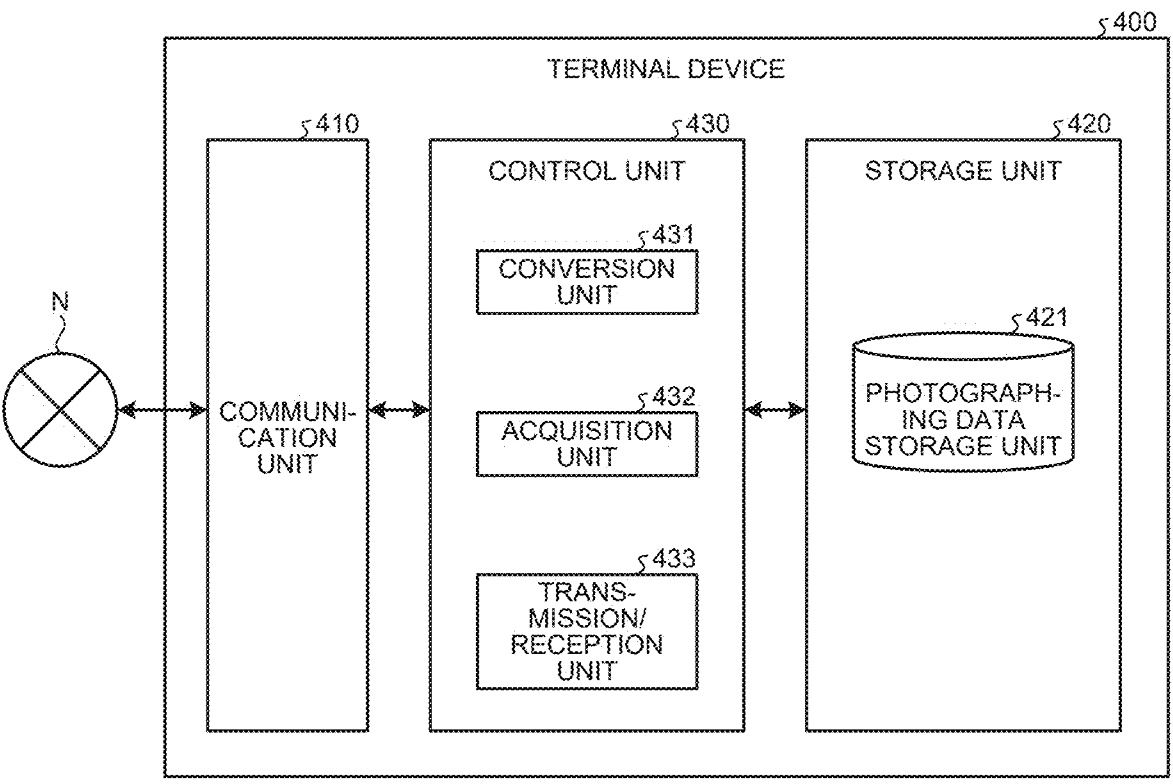
FIG. 14 illustrates a configuration example of a terminal device according to the embodiment.

Next, the configuration of the detection device 300 of the edge 200 will be described. FIG. 14 illustrates a configuration example of the detection device 300 according to the embodiment.

As illustrated in FIG. 14, the detection device 300 includes the image sensor 310. Note that, although not illustrated in FIG. 14, the detection device 300 includes an optical system for implementing a function as a digital camera and a communication system for communicating with the terminal device 400.

The image sensor 310 is, for example, a complementary metal oxide semiconductor (CMOS) image sensor including a chip. The image sensor 310 receives incident light from the optical system, performs photoelectric conversion, and outputs image data corresponding to the incident light.

The image sensor 310 has a configuration in which a pixel chip 311 is integrated with a logic chip 312 via a connection portion 313. Furthermore, the image sensor 310 includes an image processing block 320 and a signal processing block 330.

The pixel chip 311 includes an imaging unit 321. The imaging unit 321 includes a plurality of two-dimensionally arranged pixels. The imaging unit 321 is driven by an imaging processing unit 322, and captures an image.

Under the control of an imaging control unit 325, the imaging processing unit 322 performs driving of the imaging unit 321, analog to digital (AD) conversion of an analog image signal output by the imaging unit 321, and imaging processing related to imaging of an image in the imaging unit 321 such as imaging signal processing.

A captured image output from the imaging processing unit 322 is supplied to an output control unit 323, and supplied to an image compression unit 335. Furthermore, the imaging processing unit 322 passes the captured image to an output I/F 324.

The output control unit 323 performs output control of selectively outputting a captured image from the imaging processing unit 322 and a signal processing result from the signal processing block 330 from the output I/F 324 to the outside (in embodiment, terminal device 400 or action analysis device 100). That is, the output control unit 323 performs control to selectively output, to the outside, at least one of behavior data indicating a detected behavior of an object and an image.

Specifically, the output control unit 323 selects the captured image from the imaging processing unit 322 or the signal processing result from the signal processing block 330, and supplies the captured image or the signal processing result to the output I/F 324.

For example, when the action analysis device 100 requests both image data and behavior data, the output I/F 324 can output both pieces of data. Alternatively, when the action analysis device 100 requests only behavior data, the output I/F 324 can output only the behavior data. That is, when a captured image itself is not necessary for secondary analysis, the output I/F 324 can output only the signal processing result (behavior data), so that an amount of data to be output to the outside can be reduced.

Figure 13:
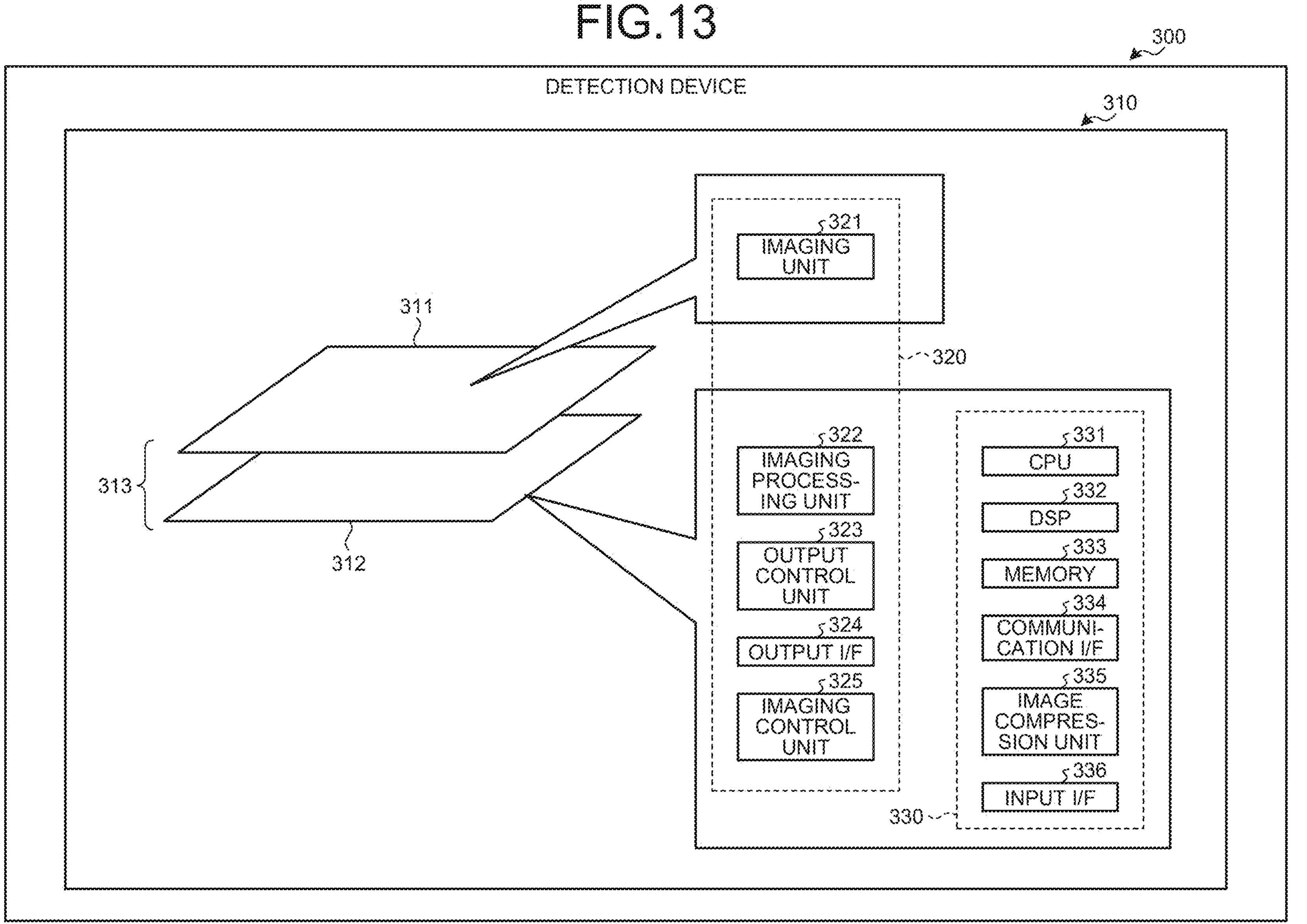
FIG. 13 illustrates a configuration example of a detection device according to the embodiment.

As illustrated in FIG. 13, the signal processing block 330 includes a CPU 331, a DSP 332, a memory 333, a communication I/F 334, the image compression unit 335, and an input I/F.

For example, the CPU 331 and the DSP 332 recognize an object from an image included in the image compression unit 335 by using a preliminary learning model incorporated in the memory 333 via the communication I/F 334 or the input I/F 336. Furthermore, the CPU 331 and the DSP 332 acquire behavior data indicating the behavior of a recognized object. In other words, in the signal processing block 330, the functional units cooperate with each other, and detect the behavior of an object included in an image by using a preliminary learning model for recognizing the object.

The above-described configuration enables the detection device 300 according to the embodiment to selectively output, to the outside, image data obtained by the image processing block 320 and behavior data obtained by the signal processing block 330.

Note that the detection device 300 may include various sensors in addition to the configuration in FIG. 13. For example, the detection device 300 may include a ToF sensor, which is a depth sensor that measures a distance to an object present in space. This enables the detection device 300 to acquire, as behavior data, not only two-dimensional point cloud data indicated on an image but three-dimensional point cloud data to which height information is added.

1-4. Configuration of Terminal Device According to Embodiment

Next, the configuration of the terminal device 400 of the edge 200 will be described. FIG. 14 illustrates a configuration example of the terminal device 400 according to the embodiment.

As illustrated in FIG. 14, the terminal device 400 includes a communication unit 410, a storage unit 420, and a control unit 430.

The communication unit 410 is implemented by, for example, an NIC and a network interface controller. The communication unit 410 is connected to the network N in a wired or wireless manner, and transmits and receives information to and from the action analysis device 100 and the like via the network N.

The storage unit 420 is implemented by, for example, a semiconductor memory element, such as a RAM and a flash memory, or a storage device, such as a hard disk and an optical disk. The storage unit 420 includes a photographing data storage unit 421 that stores photographing data including an image captured by the detection device 300 and behavior data.

The control unit 430 is implemented by, for example, a CPU, an MPU, and a GPU executing a program stored inside the terminal device 400 by using a RAM or the like as an operation region. Furthermore, the control unit 430 is a controller, and may be implemented by, for example, an integrated circuit such as an ASIC and an FPGA.

As illustrated in FIG. 14, the control unit 430 includes a conversion unit 431, an acquisition unit 432, and a transmission/reception unit 433.

When the detection device 300 detects an object, the conversion unit 431 reads a behavior on an image, and converts the behavior into behavior data. Note that, when the detection device 300 has a function of generating behavior data, the conversion unit 431 is not required to execute conversion processing.

The acquisition unit 432 acquires image data and behavior data output from the detection device 300. The acquisition unit 432 stores the acquired image data and behavior data in the photographing data storage unit 421.

The transmission/reception unit 433 receives a request from the action analysis device 100, and transmits the image data and the behavior data to the action analysis device 100 in response to the request. Furthermore, when receiving a request to photograph an operation situation of the operator 10 from the action analysis device 100, the transmission/reception unit 433 controls the detection device 300 to photograph the operation situation of the operator 10 in response to the request.

1-5. Procedure of Processing According to Embodiment

Figure 15:
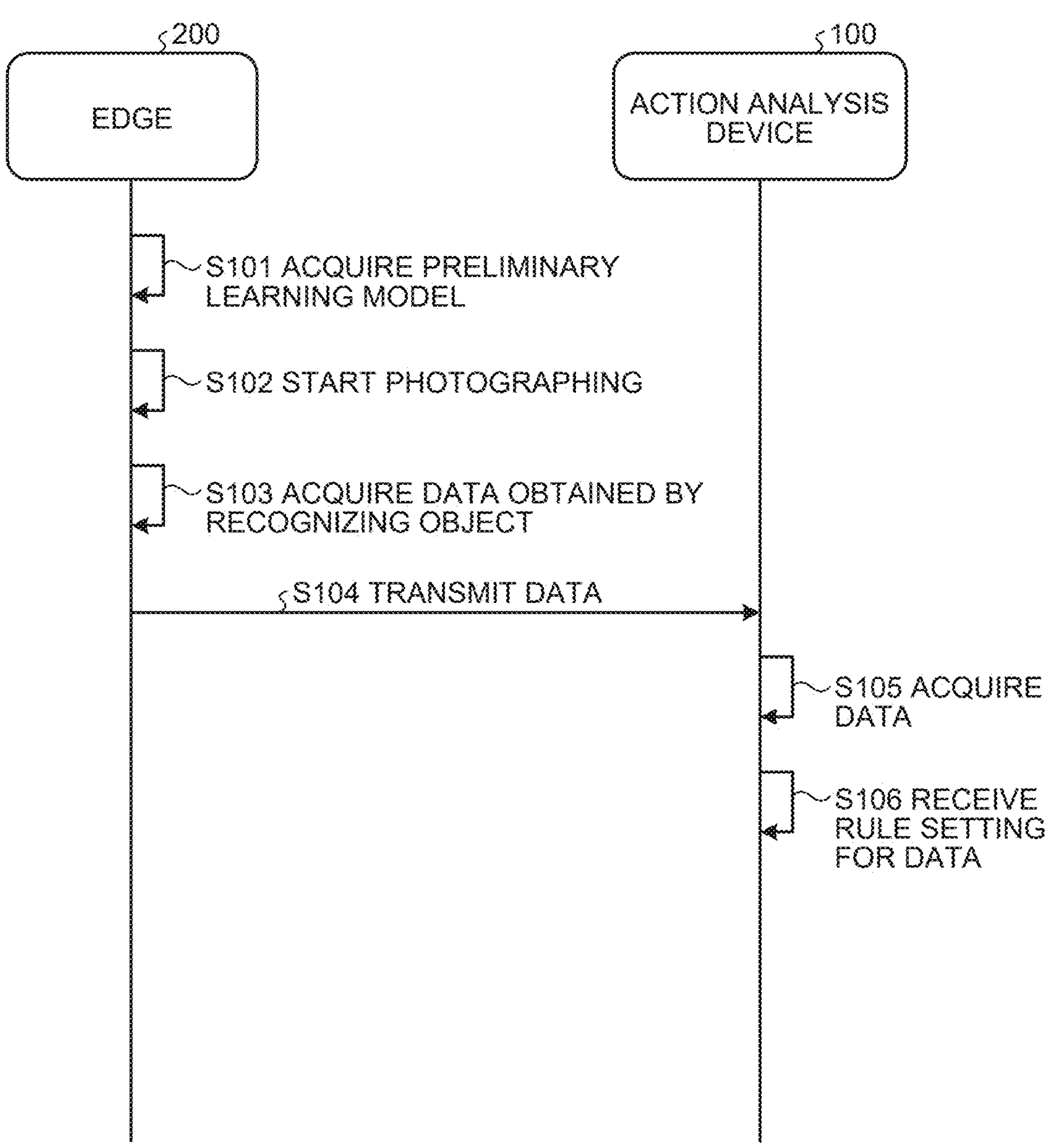
FIG. 15 is a sequence diagram (1) illustrating a flow of processing according to the embodiment.

Next, a procedure of processing according to the embodiment will be described with reference to FIGS. 15 to 17. First, processing up to rule setting in the action analysis processing according to the embodiment will be described with reference to FIG. 15. FIG. 15 is a sequence diagram (1) illustrating a flow of processing according to the embodiment.

As illustrated in FIG. 15, the edge 200 acquires a preliminary learning model in which recognition of objects such as common tools used in various factories and human hands has been learned (Step S101). Then, the edge 200 starts photographing an operation situation of any operator in response to an operation of an administrator or the like (Step S102).

The edge 200 recognizes an object during photographing, and acquires data (behavior data) obtained by recognizing the object (Step S103). Note that the edge 200 acquires not only the behavior data but image data obtained by photographing the operation. Then, the edge 200 transmits the acquired data to the action analysis device 100 (Step S104).

The action analysis device 100 acquires data from the edge 200 (Step S105). Thereafter, the action analysis device 100 receives rule setting for the data from the administrator in order to determine a required time for a process corresponding to the photographed data (Step S106).

Next, a procedure of the rule setting will be described with reference to FIG. 16. FIG. 16 is a flowchart illustrating a flow of processing according to the embodiment.

Figure 16:
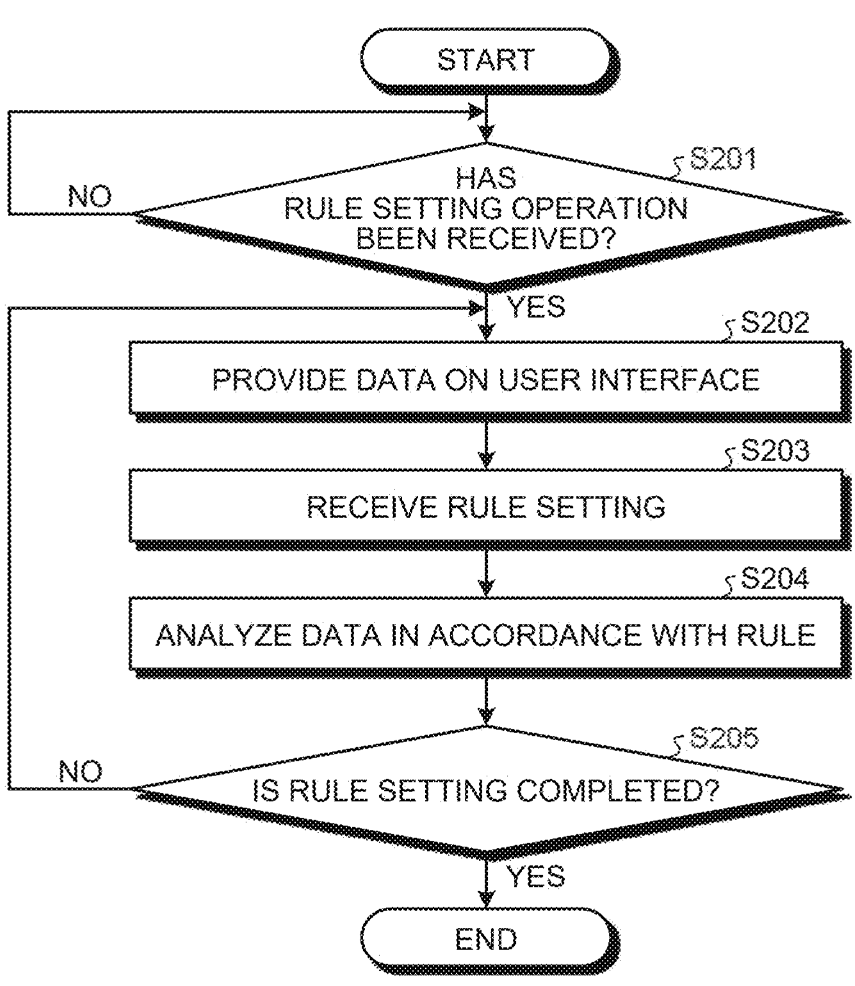
FIG. 16 is a flowchart illustrating the flow of processing according to the embodiment.

As illustrated in FIG. 16, the action analysis device 100 determines whether or not a rule setting operation has been received from the administrator (Step S201). When the rule setting operation has not been received (Step S201; No), the action analysis device 100 waits until receiving an operation.

In contrast, when the rule setting operation has been received (Step S201; Yes), the action analysis device 100 provides data on a user interface (Step S202). For example, the action analysis device 100 displays the user interface 70 in FIG. 7 so that the administrator can input information.

The action analysis device 100 receives rule setting from the administrator (Step S203). Thereafter, the action analysis device 100 analyzes the data in accordance with the received rule (Step S204). For example, the action analysis device 100 determines a required time for a certain process and the like.

Thereafter, the action analysis device 100 determines whether or not the rule setting is completed (Step S205). When the rule setting is not completed (Step S205; No), for example, when the operation of the administrator continues, the action analysis device 100 continues the processing of providing data on the user interface. In contrast, when the rule setting is completed (Step S205; Yes), the action analysis device 100 ends the processing of rule setting.

Next, a procedure of processing of analyzing an action of the operator 10 will be described with reference to FIG. 17. FIG. 17 is a flowchart (3) illustrating the flow of the processing according to the embodiment.

Figure 17:
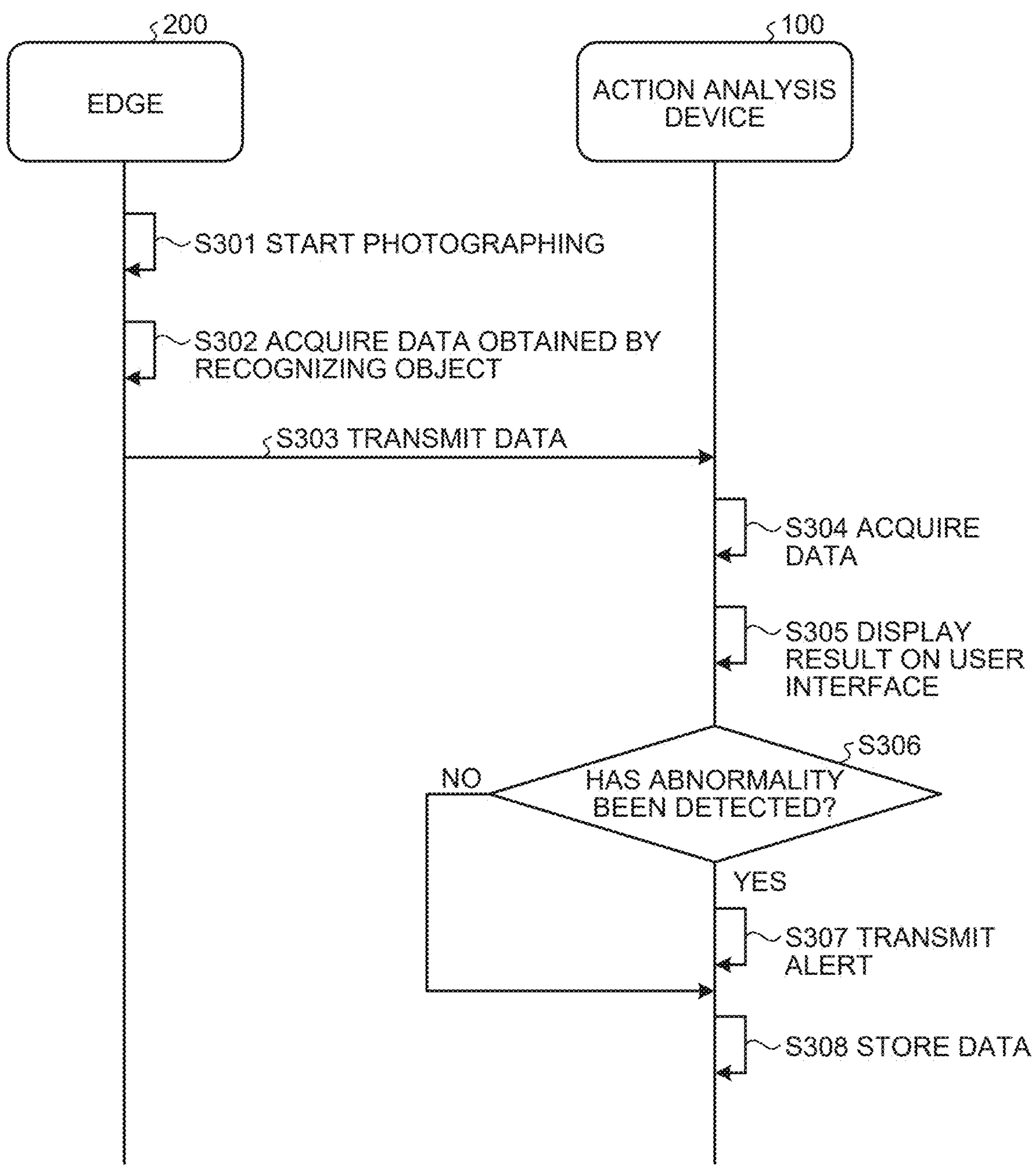
FIG. 17 is a sequence diagram (2) illustrating the flow of processing according to the embodiment.

As illustrated in FIG. 17, the edge 200 starts photographing the operator 10 who is performing an operation (Step S301). The edge 200 recognizes an object while performing photographing, and acquires data obtained by recognizing the object (Step S302). The edge 200 transmits the acquired data to the action analysis device 100 while continuing the photographing (Step S303).

The action analysis device 100 continuously acquires data from the edge 200 (Step S304). Then, the action analysis device 100 applies a rule to the acquired data, and displays the result on the user interface (Step S305).

The action analysis device 100 determines whether or not an abnormality has been detected in the acquired result (Step S306). When an abnormality has been detected (Step S306; Yes), the action analysis device 100 transmits an alert to a preliminarily registered transmission destination or the like (Step S307). When an abnormality has not been detected (Step S306; No) or when an alert is transmitted, the action analysis device 100 stores image data obtained by photographing the operator 10 and behavior data in the storage unit 120 (Step S308).

1-6. Variations According to Embodiment

The above-described embodiment may involve various different variations. For example, the edge 200 is not required to include two of the detection device 300 and the terminal device 400. For example, the edge 200 may include only one digital camera having a camera function, a sensor, a communication function, and an object recognition function.

Furthermore, in the above-described embodiment, an example in which the action analysis device 100 determines a required time for a process and the like in accordance with a rule set by the administrator or the like has been described. The action analysis device 100, however, may automatically determine the required time for a process and the like through learning processing instead of following a preset rule.

That is, the action analysis device 100 may determine the required time for a process corresponding to behavior data by learning features observed in the behavior data. For example, the action analysis device 100 may automatically detect a process break by learning features of the waveforms in FIG. 4. For example, the action analysis device 100 learns a waveform shape based on labeled teacher data in which, for example, the start to the end of a process is indicated by a waveform. The waveform indicates that an object has entered a certain region and the movement of the object exceeds a predetermined threshold (deviated from certain region). This enables the action analysis device 100 to automatically determine a required time for a process without receiving a rule from the administrator.

Furthermore, not the action analysis device 100 but the edge 200 may execute the above-described learning processing. That is, the edge 200 learns the features of the start and the end of a process based on behavior data on an object. Then, the edge 200 determines one process break while acquiring the behavior data on the object, and passes data to the action analysis device 100 for each divided process. This enables the action analysis device 100 to omit processing of determining a required time for a process and execute only action analysis, so that the processing can be more quickly performed.

Furthermore, in the above-described embodiment, an example in which the edge 200 transmits image data obtained by photographing the operator 10 and behavior data indicating a behavior of an object to the action analysis device 100 has been described. The edge 200, however, may transmit only behavior data to the action analysis device 100. This causes the action analysis system 1 to use only relatively small data such as point cloud data, so that the processing can be quickly performed. Furthermore, according to the configuration, the action analysis system 1 can operate even in a factory without a sufficient line facility that can withstand an information amount for handling image data and sufficient security against leakage of image data.

Furthermore, in the above-described embodiment, an example in which the action analysis device 100 displays, in a graph and the like, a required time in a case where the operator 10 repeats one process has been described. The action analysis device 100, however, may display, in a graph, not only the time required for one process but a required time in a case where a plurality of processes is combined. This enables the action analysis device 100 to, for example, detect not only a portion where an operation is delayed in one process but a specific delayed process from an upstream process to a downstream process.

2. Other Embodiments

The processing according to the above-described embodiment may be carried out in various forms different from the form of the above-described embodiment.

Furthermore, among pieces of processing described in the above-described embodiment, all or part of the processing described as being performed automatically can be performed manually, or all or part of the processing described as being performed manually can be performed automatically by a known method. In addition, the processing procedures, the specific names, and information including various pieces of data and parameters in the above-described document and drawings can be optionally changed unless otherwise specified. For example, various pieces of information in each figure are not limited to the illustrated information.

Furthermore, each component of each illustrated device is functional and conceptual, and does not necessarily need to be physically configured as illustrated. That is, the specific form of distribution/integration of each device is not limited to the illustrated one, and all or part of the device can be configured in a functionally or physically distributed/integrated manner in any unit in accordance with various loads and use situations. For example, the determination unit 132 may be integrated with the display control unit 133.

Furthermore, the above-described embodiment and variations thereof can be appropriately combined as long as the processing contents do not contradict each other.

Furthermore, the effects described in the present specification are merely examples and not limitations. Other effects may be exhibited.

3. Effects of Action Analysis Device, Photographing Device, and Action Analysis System According to Present Disclosure As described above, an action analysis device (action analysis device 100 in embodiment) according to the present disclosure includes an acquisition unit (acquisition unit 131 in embodiment) and a determination unit (determination unit 132 in embodiment). The acquisition unit acquires behavior data indicating a behavior of an object during an operation process, which has been recognized by a model preliminarily learned for recognizing the object. The determination unit determines a required time for a process corresponding to the behavior data based on the behavior data acquired by the acquisition unit.

As described above, the action analysis device according to the present disclosure acquires behavior data on an object recognized by a preliminarily learned model without performing machine learning and inference processing by itself, and determines a required time based on the acquired data. This enables the action analysis device to perform appropriate action analysis without performing annotation for each process and complicated machine learning processing.

Furthermore, based on time information set as the required time for the process, the determination unit determines a required time for a process corresponding to the behavior data.

As described above, the action analysis device can perform action analysis in accordance with the intention of the administrator by determining a required time for a process based on time information set as a rule.

Furthermore, the determination unit determines a process break corresponding to behavior data at the timing when the behavior data in which an object exhibits a predetermined behavior is observed between the minimum time and the maximum time set as the time information.

As described above, the action analysis device can more accurately determine the required time by receiving, as a rule, setting of the minimum and maximum times estimated in the process.

Furthermore, the determination unit determines whether or not the object exhibited a predetermined behavior based on region information set as an operation region of the process, and determines a process break corresponding to the behavior data.

As described above, the action analysis device can more accurately detect a process break by preliminarily receiving an operation region in which the object behaves from the administrator or the like.

Furthermore, the determination unit determines the process break corresponding to the behavior data at the timing when behavior data indicating that a predetermined time has elapsed since the object deviated from a region set as region information is observed.

As described above, the action analysis device can more accurately detect the process break by receiving, as region information, an event in which an operation is generally estimated to have ended, such as the object deviating from an angle of view.

Furthermore, the determination unit determines the required time for a process corresponding to behavior data by learning features observed in the behavior data.

As described above, the action analysis device can perform appropriate analysis without taking time and effort for rule setting by determining a required time based not on a rule but on learning.

Furthermore, the action analysis device further includes a display control unit (display control unit 133 in embodiment) that lists required times for processes corresponding to behavior data determined by the determination unit a plurality of times on the user interface along a time axis.

As described above, the action analysis device can cause, for example, at which timing in a process a problem has occurred to be easily grasped by listing required times spent for each process.

Furthermore, the display control unit compares first behavior data with second behavior data. The first behavior data is optionally selected from a plurality of pieces of behavior data. The second behavior data is used as a comparison target. A portion of a required time corresponding to one process is highlighted based on the similarity between behavior data corresponding to one process in the second behavior data and behavior data corresponding to one process in the first behavior data.

As described above, the action analysis device enables the administrator and the like to easily grasp the accuracy and result of an operation by, for example, comparing behavior data on a skilled person and the like serving as a sample with behavior data on a specific operator and displaying the result in different colors.

Furthermore, the action analysis device further includes a display control unit (display control unit 133 in embodiment) that displays a result obtained by comparing the first behavior data with the second behavior data on the user interface in a graph. The first behavior data is optionally selected from a plurality of pieces of behavior data. The second behavior data is used as a comparison target.

As described above, the action analysis device enables the administrator and the like to easily grasp the accuracy and result of an operation by comparing behavior data on a skilled person and the like serving as a sample with behavior data on a specific operator.

Furthermore, the display control unit determines whether or not there is an abnormality in the process corresponding to the second behavior data based on the similarity between the waveform corresponding to the first behavior data and the waveform corresponding to the second behavior data in the graph.

As described above, the action analysis device can appropriately detect that there is some abnormality in a process by determining the similarity between waveforms by using a method such as DTW.

Furthermore, the display control unit determines whether or not a plurality of processes corresponding to the second behavior data matches a plurality of processes corresponding to the first behavior data based on the similarity between the waveform corresponding to the first behavior data and the waveform corresponding to the second behavior data in the graph. When the plurality of processes does not match each other, the display control unit determines that there is an abnormality in a process corresponding to the second behavior data.

As described above, the action analysis device can detect that, for example, some operation has been skipped by determining the similarity between waveforms, so that manufacturing of a defective product and occurrence of a serious accident can be prevented.

Furthermore, the action analysis device further includes a transmission unit (transmission unit 134 in embodiment) that transmits a warning to a preliminarily registered transmission destination when the display control unit determines that there is an abnormality in a process corresponding to the second behavior data.

As described above, the action analysis device can quickly transmit an abnormality to the administrator or the like by transmitting a warning (alert) related to some abnormality.

Furthermore, the acquisition unit acquires behavior data on an object detected by an image sensor from the image sensor by using a model incorporated in a chip (logic chip 312 in embodiment) integrated with the image sensor.

As described above, the action analysis device acquires data from an integrated chip (referred to as AI chip and like) capable of performing object recognition, so that the action analysis device is not required to perform complicated inference processing and the like by itself, and can perform quick analysis.

Furthermore, a photographing device (edge 200 in embodiment) includes an imaging unit (imaging unit 321 in embodiment), a detection unit (signal processing block 330 in embodiment), and an output control unit (output control unit 323 in embodiment). The imaging unit captures an image including an object. The detection unit detects the behavior of the object included in the image by using a preliminary learning model for recognizing the object. The output control unit selectively outputs, to the outside, at least one of behavior data indicating the behavior of the object detected by the detection unit and the image.

As described above, the photographing device according to the present disclosure can reduce an amount of data to be handled and reduce a processing load related to secondary analysis in a subsequent stage by simultaneously acquiring image data and behavior data and selectively outputting, to the outside, one of the image data and the behavior data.

Furthermore, the action analysis system (action analysis system 1 in embodiment) includes the photographing device and the action analysis device. A photographing device includes: an imaging unit that captures an image including an object; a detection unit that detects a behavior of the object included in the image by using a preliminary learning model for recognizing the object; and an output control unit that selectively outputs, to outside, at least one of behavior data indicating the behavior of the object detected by the detection unit and the image. The action analysis device includes: an acquisition unit that acquires behavior data output from the output unit; and a determination unit that determines a required time for a process corresponding to the behavior data based on the behavior data acquired by the acquisition unit.

As described above, the action analysis system according to the present disclosure transfers data in a state where a photographing side (edge side) has performed facilitated inference processing such as object recognition processing, and performs secondary analysis in a subsequent stage. The action analysis system thus can perform appropriate action analysis while reducing a load of learning.

4. Hardware Configuration

Figure 18:
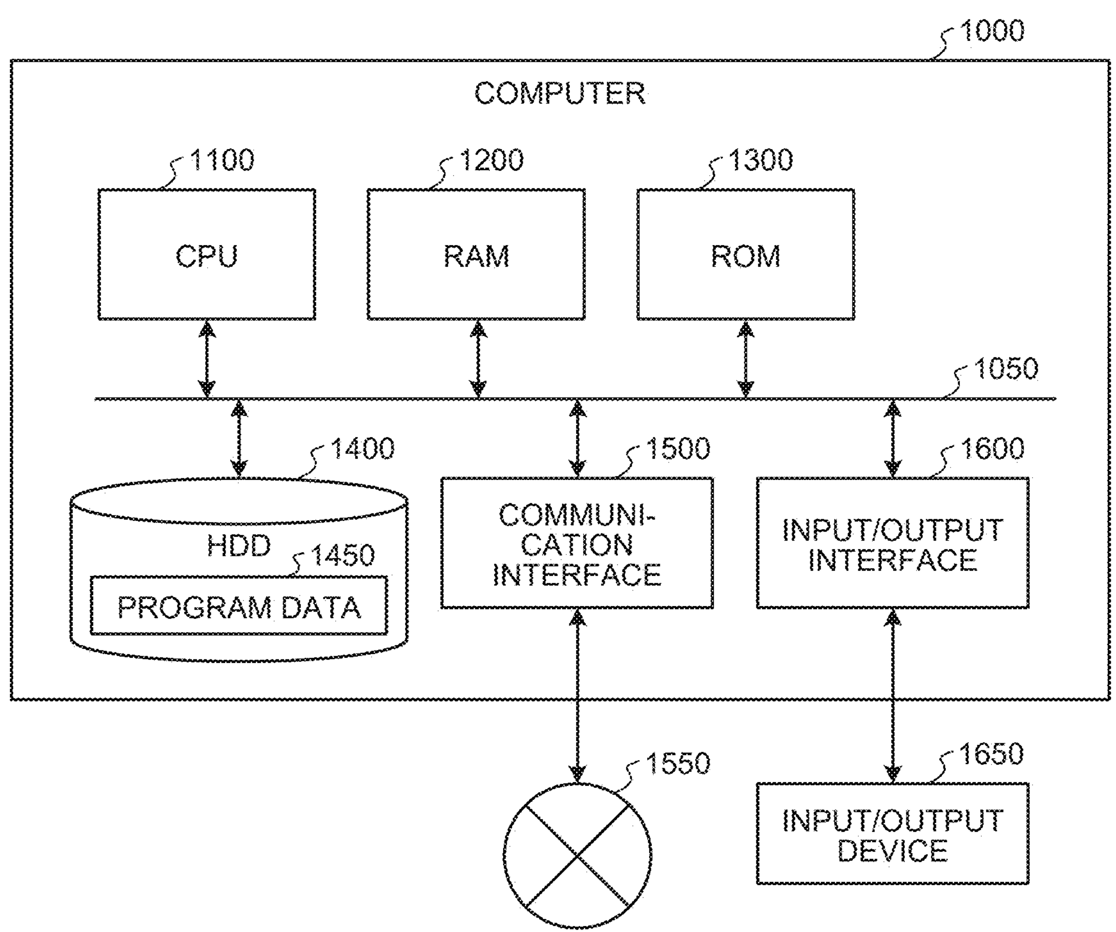
FIG. 18 is a hardware configuration diagram illustrating one example of a computer that implements the function of the action analysis device.

Information equipment such as the action analysis device 100 according to the above-described embodiment is implemented by a computer 1000 having a configuration as illustrated in FIG. 18, for example. The action analysis device 100 according to the present disclosure will be described below as an example. FIG. 18 is a hardware configuration diagram illustrating one example of the computer 1000 that implements the function of the action analysis device 100. The computer 1000 includes a CPU 1100, a RAM 1200, a read only memory (ROM) 1300, a hard disk drive (HDD) 1400, a communication interface 1500, and an input/output interface 1600. Units of the computer 1000 are connected by a bus 1050.

The CPU 1100 operates based on a program stored in the ROM 1300 or the HDD 1400, and controls each unit. For example, the CPU 1100 develops the program stored in the ROM 1300 or the HDD 1400 on the RAM 1200, and executes processing corresponding to various programs.

The ROM 1300 stores a boot program such as a basic input output system (BIOS) executed by the CPU 1100 at the time when the computer 1000 is started, a program depending on the hardware of the computer 1000, and the like.

The HDD 1400 is a computer-readable recording medium that non-transiently records a program executed by the CPU 1100, data used by the program, and the like. Specifically, the HDD 1400 is a recording medium that records an action analysis program according to the present disclosure. The action analysis program is one example of program data 1450.

The communication interface 1500 connects the computer 1000 with an external network 1550 (e.g., Internet). For example, the CPU 1100 receives data from other equipment, and transmits data generated by the CPU 1100 to other equipment via the communication interface 1500.

The input/output interface 1600 connects an input/output device 1650 with the computer 1000. For example, the CPU 1100 receives data from an input device such as a keyboard and a mouse via the input/output interface 1600. Furthermore, the CPU 1100 transmits data to an output device such as a display, an edge, and a printer via the input/output interface 1600. Furthermore, the input/output interface 1600 may function as a medium interface that reads a program and the like recorded in a predetermined recording medium. The medium includes, for example, an optical recording medium such as a digital versatile disc (DVD) and a phase change rewritable disk (PD), a magneto-optical recording medium such as a magneto-optical disk (MO), a tape medium, a magnetic recording medium, and a semiconductor memory.

For example, when the computer 1000 functions as the action analysis device 100 according to the embodiment, the CPU 1100 of the computer 1000 implements the functions of the control unit 130 and the like by executing an action analysis program loaded on the RAM 1200. Furthermore, the HDD 1400 stores an action analysis program according to the present disclosure and data in the storage unit 120. Note that the CPU 1100 reads the program data 1450 from the HDD 1400 and executes the program data 1450. In another example, the CPU 1100 may acquire these programs from another device via the external network 1550.

Note that the present technology can also have the configurations as follows.

(1) An action analysis device comprising:
- an acquisition unit that acquires behavior data indicating a behavior of an object during an operation process, which has been recognized by a model preliminarily learned for recognizing the object; and
- a determination unit that determines a required time for a process corresponding to the behavior data based on the behavior data acquired by the acquisition unit.

(2) The action analysis device according to (1),
- wherein, based on time information set as the required time for the process, the determination unit determines a required time for a process corresponding to the behavior data.

(3) The action analysis device according to (2),
- wherein the determination unit determines a process break corresponding to behavior data at timing when the behavior data in which the object exhibits a predetermined behavior is observed between a minimum time and a maximum time set as the time information.

(4) The action analysis device according to (3),
- wherein the determination unit determines whether or not the object has exhibited a predetermined behavior based on region information set as an operation region of the process, and determines a process break corresponding to the behavior data.

(5) The action analysis device according to (4),
- wherein the determination unit determines a process break corresponding to the behavior data at timing when the behavior data indicating that a predetermined time has elapsed since the object deviated from a region set as the region information is observed.

(6) The action analysis device according to any one of (1) to (5),
- wherein the determination unit determines a required time for a process corresponding to the behavior data by learning a feature observed in the behavior data.

(7) The action analysis device according to any one of (1) to (6), further comprising
- a display control unit that lists required times for processes corresponding to the behavior data determined by the determination unit a plurality of times on a user interface along a time axis.

(8) The action analysis device according to (7),
- wherein the display control unit compares first behavior data optionally selected from a plurality of pieces of behavior data with second behavior data serving as a comparison target, and highlights a portion of a required time corresponding to one process based on similarity between behavior data corresponding to one process in the second behavior data and behavior data corresponding to one process in the first behavior data.

(9) The action analysis device according to any one of (1) to (6), further comprising
- a display control unit that displays a result obtained by comparing first behavior data optionally selected from a plurality of pieces of behavior data with second behavior data used as a comparison target on a user interface in a graph.

(10) The action analysis device according to (9),
- wherein the display control unit determines whether or not there is an abnormality in a process corresponding to the second behavior data based on similarity between a waveform corresponding to the first behavior data and a waveform corresponding to the second behavior data in the graph.

(11) The action analysis device according to (10),
- wherein the display control unit determines whether or not a plurality of processes corresponding to the second behavior data matches a plurality of processes corresponding to the first behavior data based on similarity between a waveform corresponding to the first behavior data and a waveform corresponding to the second behavior data in the graph, and, when the plurality of processes does not match each other, determines that there is an abnormality in a process corresponding to the second behavior data.

(12) The action analysis device according to any one of (1) to (11), further comprising
- a transmission unit that transmits a warning to a preliminarily registered transmission destination when the display control unit determines that there is an abnormality in a process corresponding to the second behavior data.

(13) The action analysis device according to any one of (1) to (12), wherein the acquisition unit acquires behavior data on the object detected by an image sensor from the image sensor by using a model incorporated in a chip integrated with the image sensor.

(14) An action analysis method comprising: a computer acquiring behavior data indicating a behavior of an object during an operation process, which has been recognized by a model preliminarily learned for recognizing the object; and determining a required time for a process corresponding to the behavior data based on the behavior data that has been acquired.

(15) An action analysis program causing a computer to function as:

an acquisition unit that acquires behavior data indicating a behavior of an object during an operation process, which has been recognized by a model preliminarily learned for recognizing the object; and a determination unit that determines a required time for a process corresponding to the behavior data based on the behavior data acquired by the acquisition unit.

(16) A photographing device comprising:

an imaging unit that captures an image including an object;

a detection unit that detects a behavior of the object included in the image by using a preliminary learning model for recognizing the object; and an output control unit that selectively outputs, to outside, at least one of behavior data indicating the behavior of the object detected by the detection unit and the image.

(17) An action analysis system comprising:

a photographing device including:

an imaging unit that captures an image including an object;

a detection unit that detects a behavior of the object included in the image by using a preliminary learning model for recognizing the object; and an output control unit that selectively outputs, to outside, at least one of behavior data indicating the behavior of the object detected by the detection unit and the image; and an action analysis device including:

an acquisition unit that acquires behavior data output from the output control unit; and a determination unit that determines a required time for a process corresponding to the behavior data based on the behavior data acquired by the acquisition unit.

REFERENCE SIGNS LIST

1 ACTION ANALYSIS SYSTEM
10 OPERATOR
100 ACTION ANALYSIS DEVICE
110 COMMUNICATION UNIT
120 STORAGE UNIT
121 PHOTOGRAPHING DATA STORAGE UNIT
122 RULE STORAGE UNIT
130 CONTROL UNIT
131 ACQUISITION UNIT
132 DETERMINATION UNIT
133 DISPLAY CONTROL UNIT
134 TRANSMISSION UNIT
200 EDGE
300 DETECTION DEVICE
400 TERMINAL DEVICE

The invention claimed is:

1. An action analysis device comprising:

processing circuitry configured to acquire behavior data indicating a behavior of an object during an operation process, which has been recognized by a model preliminarily learned for recognizing the object;

determine a required time for a process corresponding to the behavior data based on the behavior data;

display a result obtained by comparing first behavior data optionally selected from a plurality of pieces of behavior data with second behavior data used as a comparison target on a user interface in a graph; and determine whether or not there is an abnormality in a process corresponding to the second behavior data based on similarity between a waveform corresponding to the first behavior data and a waveform corresponding to the second behavior data in the graph.

2. The action analysis device according to claim 1, wherein the processing circuitry is configured to determine the required time for the process corresponding to the behavior data based on time information set as the required time for the process.

3. The action analysis device according to claim 2, wherein the processing circuitry is configured to determine a process break corresponding to behavior data at a timing when the behavior data in which the object exhibits a predetermined behavior is observed between a minimum time and a maximum time set as the time information.

4. The action analysis device according to claim 3, wherein the processing circuitry is configured to determine whether or not the object has exhibited the predetermined behavior based on region information set as an operation region of the process, and determine the process break corresponding to the behavior data.

5. The action analysis device according to claim 4, wherein the processing circuitry is configured to determine the process break corresponding to the behavior data at a timing when the behavior data indicating that a predetermined time has elapsed since the object deviated from a region set as the region information is observed.

6. The action analysis device according to claim 1, wherein the processing circuitry is configured to determine the required time for the process corresponding to the behavior data by learning a feature observed in the behavior data.

7. The action analysis device according to claim 1, wherein the processing circuitry is configured to list required times for processes corresponding to the behavior data a plurality of times on the user interface along a time axis.

8. The action analysis device according to claim 7, wherein the processing circuitry is configured to:

compare the first behavior data with the second behavior data, and highlight a portion of a required time corresponding to one process based on similarity between behavior data corresponding to one process in the second behavior data and behavior data corresponding to one process in the first behavior data.

9. The action analysis device according to claim 1 wherein the processing circuitry is configured to:

determine whether or not a plurality of processes corresponding to the second behavior data matches a plurality of processes corresponding to the first behavior data based on similarity between the waveform corresponding to the first behavior data and the waveform corresponding to the second behavior data in the graph, and when the plurality of processes do not match each other, determine that there is the abnormality in the process corresponding to the second behavior data.

10. The action analysis device according to claim 9, wherein the processing circuitry is configured to transmit a warning to a preliminarily registered transmission destination when the processing circuitry determines that there is the abnormality in the process corresponding to the second behavior data.

11. The action analysis device according to claim 1, wherein the processing circuitry is configured to acquire behavior data on the object detected by an image sensor from the image sensor by using a model incorporated in a chip integrated with the image sensor.

12. An action analysis method comprising:

acquiring, via processing circuitry, behavior data indicating a behavior of an object during an operation process, which has been recognized by a model preliminarily learned for recognizing the object;

determining, via the processing circuitry, a required time for a process corresponding to the behavior data based on the behavior data that has been acquired;

displaying, by the processing circuitry, a result obtained by comparing first behavior data optionally selected from a plurality of pieces of behavior data with second behavior data used as a comparison target on a user interface in a graph; and determining, by the processing circuitry, whether or not there is an abnormality in a process corresponding to the second behavior data based on similarity between a waveform corresponding to the first behavior data and a waveform corresponding to the second behavior data in the graph.

13. A non-transitory computer-readable storage medium storing an action analysis program that, when executed by a computer, causes the computer to perform a method, the method comprising:

acquiring behavior data indicating a behavior of an object during an operation process, which has been recognized by a model preliminarily learned for recognizing the object;

determining a required time for a process corresponding to the behavior data based on the behavior data;

displaying a result obtained by comparing first behavior data optionally selected from a plurality of pieces of behavior data with second behavior data used as a comparison target on a user interface in a graph; and determining whether or not there is an abnormality in a process corresponding to the second behavior data based on similarity between a waveform corresponding to the first behavior data and a waveform corresponding to the second behavior data in the graph.

14. An action analysis system comprising:

a photographing device including:

an image sensor that captures an image including an object;

detection processing circuitry that detects a behavior of the object included in the image by using a preliminary learning model for recognizing the object; and output control processing circuitry that selectively outputs, to the outside, at least one of behavior data indicating the behavior of the object detected by the detection processing circuitry and the image; and an action analysis device including:

processing circuitry configured to:

acquire behavior data output from the output control processing circuitry; and determine a required time for a process corresponding to the behavior data based on the behavior data;

display a result obtained by comparing first behavior data optionally selected from a plurality of pieces of behavior data with second behavior data used as a comparison target on a user interface in a graph; and determine whether or not there is an abnormality in a process corresponding to the second behavior data based on similarity between a waveform corresponding to the first behavior data and a waveform corresponding to the second behavior data in the graph.

* * * * *